US010775986B2

(12) United States Patent
Dellinger et al.

(10) Patent No.: US 10,775,986 B2
(45) Date of Patent: Sep. 15, 2020

(54) ERGONOMIC ADJUSTMENTS

(71) Applicant: Apple Inc., Cupertino, CA (US)

(72) Inventors: Richard R. Dellinger, San Jose, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 15/719,390

(22) Filed: Sep. 28, 2017

(65) Prior Publication Data

US 2018/0275860 A1    Sep. 27, 2018

Related U.S. Application Data

(60) Provisional application No. 62/476,514, filed on Mar. 24, 2017.

(51) Int. Cl.
| *G06F 17/00* | (2019.01) |
| *G06F 3/00* | (2006.01) |
| *G06F 3/0484* | (2013.01) |
| *G06F 1/16* | (2006.01) |
| *G06F 3/01* | (2006.01) |
| *G06F 3/033* | (2013.01) |
| *H04M 1/725* | (2006.01) |
| *G06F 3/02* | (2006.01) |
| *G06K 9/00* | (2006.01) |
| *G06F 3/0487* | (2013.01) |

(52) U.S. Cl.
CPC ........ *G06F 3/04847* (2013.01); *G06F 1/1601* (2013.01); *G06F 3/011* (2013.01); *G06F 3/02* (2013.01); *G06F 3/033* (2013.01); *H04M 1/7253* (2013.01); *G06F 3/0487* (2013.01); *G06F 2200/1614* (2013.01); *G06K 9/00288* (2013.01)

(58) Field of Classification Search
CPC ... G06F 3/0481; G06F 3/04847; G06F 1/1601
USPC .................................................. 715/750, 200
See application file for complete search history.

(56) References Cited

U.S. PATENT DOCUMENTS

| 9,694,770 B2 * | 7/2017 | Tobin | B60R 16/037 |
| 2007/0124600 A1 * | 5/2007 | Huang | G06F 21/32 |
| | | | 713/186 |
| 2017/0050308 A1 * | 2/2017 | Charlton | B25H 1/16 |

* cited by examiner

*Primary Examiner* — Manglesh M Patel
(74) *Attorney, Agent, or Firm* — Dentons US LLP

(57) ABSTRACT

The present disclosure generally relates to devices and systems that configure data access control and device-associated operating environment parameters based on a detected user identifier. In some examples, a user device identifies a user and configures the electronic device using a user's data access control profile settings and configures an ergonomic environment using the user's operating environmental profile settings. In some examples, the electronic device changes the ergonomic environment for the user, but maintains a data access control setting which was previously set for a different user.

39 Claims, 35 Drawing Sheets

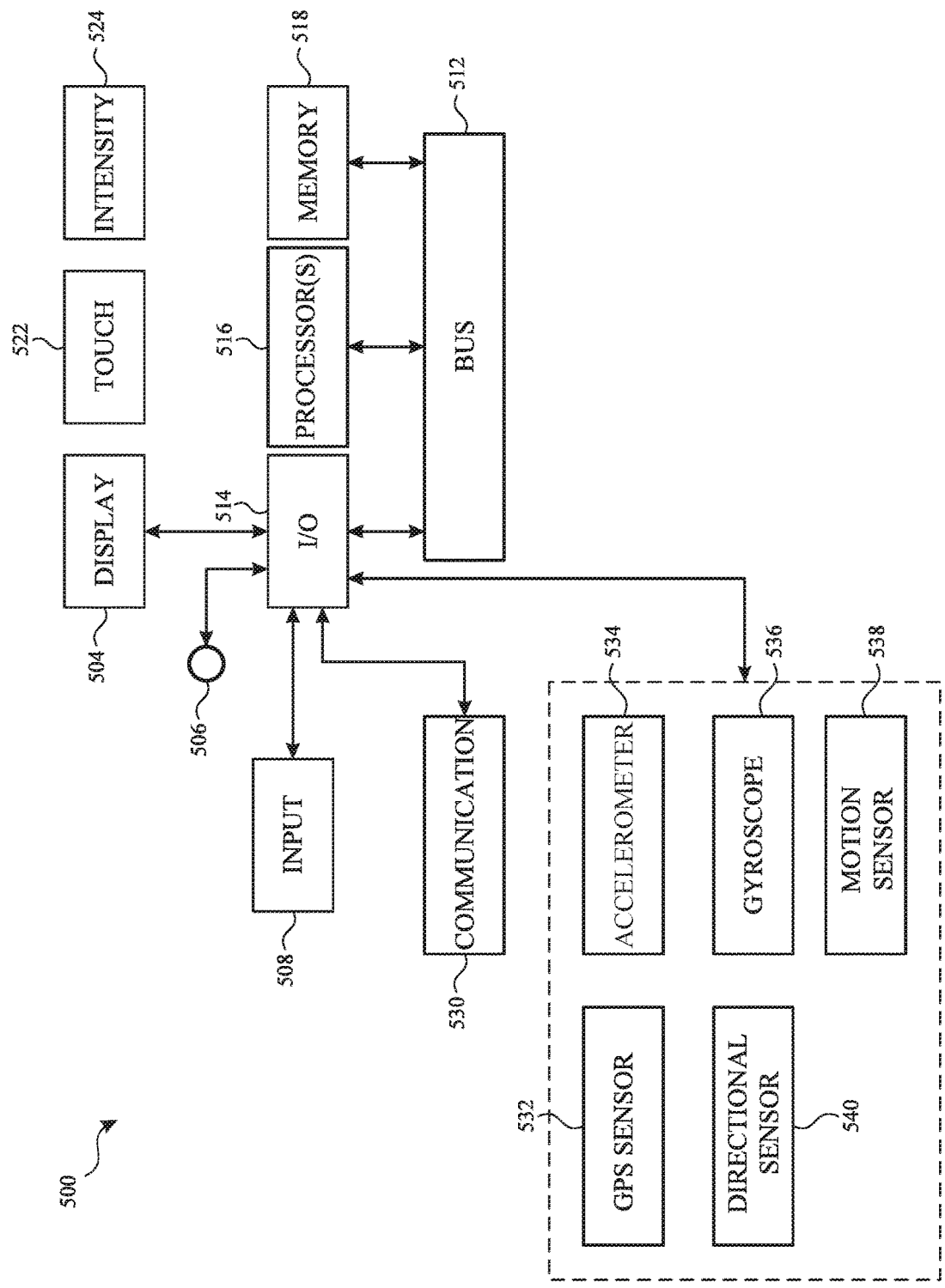

7016
Configuring the operating environment using a second operating environment profile different from the first operating environment profile, wherein the environment change criteria includes a criterion that is satisfied when the second user identifier correspond to a second data access control profile different from the first data access control profile.

(A)

7018
The first data access control profile includes a data setting corresponding to a grant of access to a resource and the second data access control profile does not include a data setting corresponding to a grant of access to the resource.

7020
The first operating environment profile includes a first environmental setting and the second operating environment profile includes a second environmental setting, wherein the first environment setting is distinct from the second environmental setting.

7022
The first environmental setting and the second environmental setting are defined prior to receiving the second user identifier

7024
Receiving at least one of the first environmental setting and the second environmental setting from a second device that is remote from the electronic device

7026
Maintaining at least a third environmental setting of the operating environment configured based on the first operating environment profile.

*FIG. 7B*

ERGONOMIC ADJUSTMENTS

CROSS-REFERENCE TO RELATED APPLICATIONS

This application claims priority to U.S. Provisional Application No. 62/476,514, filed Mar. 24, 2017, the entire contents of which are hereby incorporated by reference.

FIELD

The present disclosure relates generally to user interaction with an electronic device, and more specifically to devices, systems, and techniques for making ergonomic environment adjustments.

BACKGROUND

As technological progress advances, many electronic devices are becoming more user configurable allowing for a more comfortable and user specific ergonomic environment. At the same time, collaboration between users is also on the rise. Consequently, there is a need to allow for users to collaborate and allow for quick adjustment for each user's ergonomic environment preference.

BRIEF SUMMARY

Some techniques for making ergonomic adjustments using electronic devices, however, are generally cumbersome and inefficient. For example, some existing techniques use a complex and time-consuming processes, which may include multiple inputs and require too much user interaction. Existing techniques require more time than necessary, wasting user time and device energy. This latter consideration is particularly important in battery-operated devices.

Accordingly, the present technique provides electronic devices with faster, more efficient methods and interfaces for making ergonomic adjustments. Such methods and interfaces optionally complement or replace other methods for making ergonomic adjustments. Such methods and interfaces reduce the cognitive burden on a user and produce a more efficient way of adjusting an ergonomic environment for each user's ergonomic environment preference. For battery-operated computing devices, such methods and interfaces conserve power and increase the time between battery charges by avoiding unnecessary adjustments.

In accordance with some embodiments, a method is performed at an electronic device with a first input mechanism and a second input mechanism: receiving, via the first input mechanism, a first user identifier; in accordance with a determination that the first user identifier corresponds to a first data access control profile: configuring the electronic device using the first data access control profile; and configuring an operating environment using a first operating environment profile; while the electronic device remains configured using the first data access control profile: receiving, via the second input mechanism different from the first input mechanism, a second user identifier; in accordance with a determination that the second user identifier satisfies an environmental change criteria, configuring the operating environment using a second operating environment profile different from the first operating environment profile, wherein the environment change criteria includes a criterion that is satisfied when the second user identifier correspond to a second data access control profile different from the first data access control profile.

In accordance with some embodiments, an electronic device is described. The electronic device, comprises: a first input mechanism and a second input mechanism; one or more processors; and memory storing one or more programs configured to be executed by the one or more processors, the one or more programs including instructions for receiving, via the first input mechanism, a first user identifier; in accordance with a determination that the first user identifier corresponds to a first data access control profile: configuring the electronic device using the first data access control profile; and configuring an operating environment using a first operating environment profile; while the electronic device remains configured using the first data access control profile: receiving, via the second input mechanism different from the first input mechanism, a second user identifier; in accordance with a determination that the second user identifier satisfies an environmental change criteria, configuring the operating environment using a second operating environment profile different from the first operating environment profile, wherein the environment change criteria includes a criterion that is satisfied when the second user identifier correspond to a second data access control profile different from the first data access control profile.

In accordance with some embodiments, a non-transitory computer-readable storage medium is described. The non-transitory computer-readable storage medium stores one or more programs configured to be executed by one or more processors of an electronic device with a first input mechanism and a second input mechanism, the one or more programs including instructions for: receiving, via the first input mechanism, a first user identifier; in accordance with a determination that the first user identifier corresponds to a first data access control profile: configuring the electronic device using the first data access control profile; and configuring an operating environment using a first operating environment profile; while the electronic device remains configured using the first data access control profile: receiving, via the second input mechanism different from the first input mechanism, a second user identifier; in accordance with a determination that the second user identifier satisfies an environmental change criteria, configuring the operating environment using a second operating environment profile different from the first operating environment profile, wherein the environment change criteria includes a criterion that is satisfied when the second user identifier correspond to a second data access control profile different from the first data access control profile.

In accordance with some embodiments, a transitory computer-readable storage medium is described. The transitory computer-readable storage medium stores one or more programs configured to be executed by one or more processors of an electronic device with a first input mechanism and a second input mechanism, the one or more programs including instructions for: receiving, via the first input mechanism, a first user identifier; in accordance with a determination that the first user identifier corresponds to a first data access control profile: configuring the electronic device using the first data access control profile; and configuring an operating environment using a first operating environment profile; while the electronic device remains configured using the first data access control profile: receiving, via the second input mechanism different from the first input mechanism, a second user identifier; in accordance with a determination that the second user identifier satisfies an environmental change criteria, configuring the operating environment using a second operating environment profile different from the first operating environment profile, wherein the environment change criteria includes a criterion that is satisfied when the second user identifier correspond to a second data access control profile different from the first data access control profile.

In accordance with some embodiments, an electronic device is described. The electronic device comprises: a first input mechanism; a second input mechanism; means for receiving, via the first input mechanism, a first user identifier; means, in accordance with a determination that the first user identifier corresponds to a first data access control profile, for: configuring the electronic device using the first data access control profile; and configuring an operating environment using a first operating environment profile; and means for, while the electronic device remains configured using the first data access control profile: receiving, via the second input mechanism different from the first input mechanism, a second user identifier; and in accordance with a determination that the second user identifier satisfies an environmental change criteria, configuring the operating environment using a second operating environment profile different from the first operating environment profile, wherein the environment change criteria includes a criterion that is satisfied when the second user identifier correspond to a second data access control profile different from the first data access control profile.

In accordance with some embodiments, an electronic device is described. The electronic device comprises: a first input mechanism unit and a second input mechanism unit; a processing unit coupled to the first input mechanism and the second input mechanism, the processing unit configured to: receive, via the first input mechanism unit, a first user identifier; in accordance with a determination that the first user identifier corresponds to a first data access control profile: configure the electronic device using the first data access control profile; and configure an operating environment using a first operating environment profile; and while the electronic device remains configured using the first data access control profile: receive, via the second input mechanism unit different from the first input mechanism unit, a second user identifier; and in accordance with a determination that the second user identifier satisfies an environmental change criteria, configure the operating environment using a second operating environment profile different from the first operating environment profile, wherein the environment change criteria includes a criterion that is satisfied when the second user identifier correspond to a second data access control profile different from the first data access control profile.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for making ergonomic environment adjustments, thereby increasing the effectiveness, efficiency, and user satisfaction with such devices. Such methods and interfaces may complement or replace other methods for making ergonomic environment adjustments.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

FIGS. 7A-7B is a flow diagram illustrating a method for making ergonomic environment adjustments, in accordance with some embodiments.

DESCRIPTION OF EMBODIMENTS

Figure 1A:
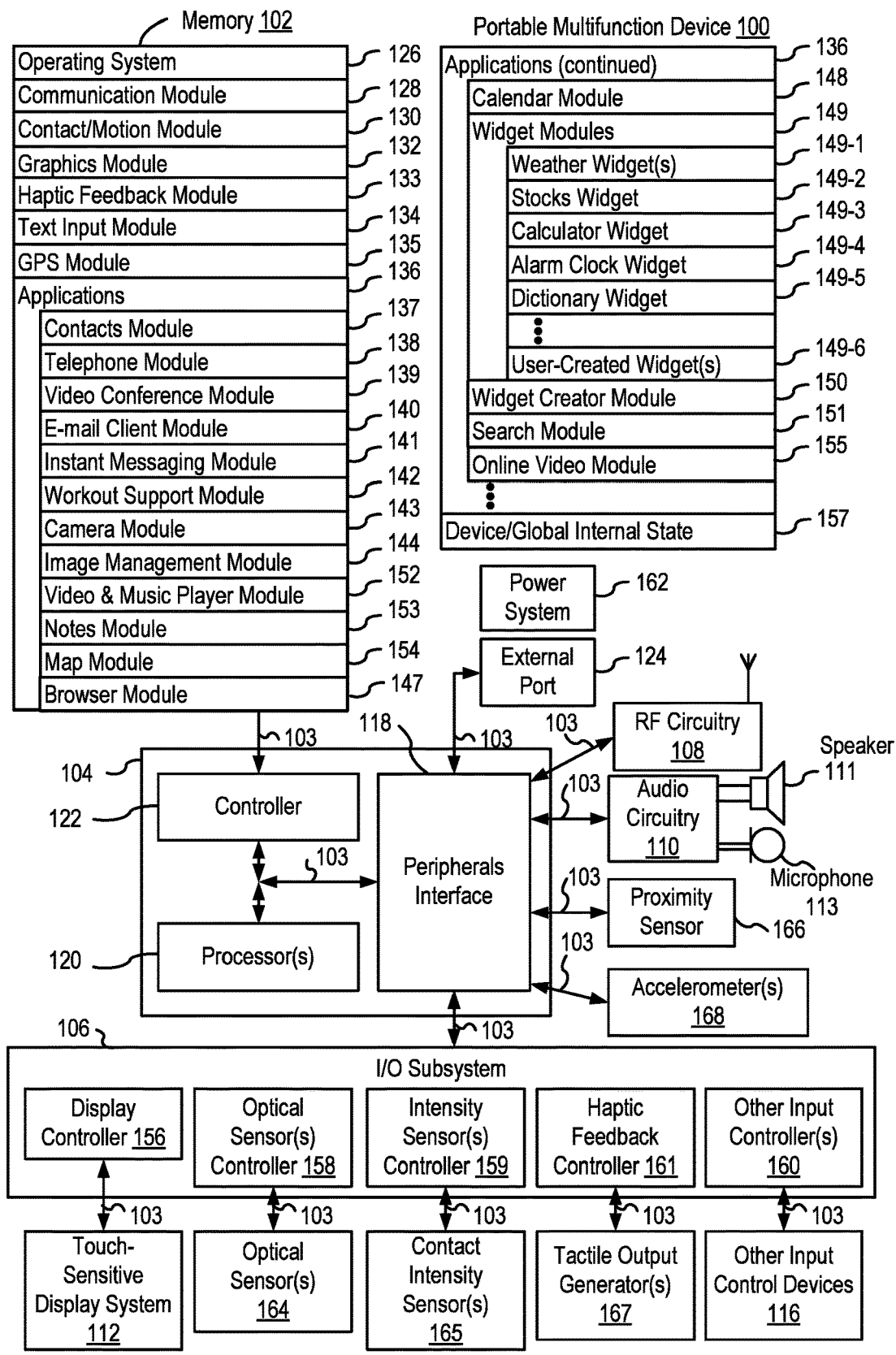
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

The modern office space allows for many varying manual ergonomic configurations to provide a more enjoyable and productive work environment. A proper ergonomic work environment is helpful to avoid possible injury (e.g., carpal tunnel, tendinitis, muscle strains and low back injuries) as well as provide a more pleasing work environment (e.g., the sound is at the desired level, the monitor is at the desired brightness). However, making the proper adjustments is a painstaking activity, which requires prior knowledge of how to make the adjustments and memory recall to remember which adjustments are preferred. Making the necessary ergonomic adjustments is especially bothersome when several people are both sharing the same work environment. For example, a tall user and a shorter user may both be collaborating on a project by taking turns using one computer. However, the users do not have a quick and easy way of adjusting the ergonomic environment so as to make the environment safe and pleasant each and every time they rotate using the computer. Using the prior technology, each user would have to independently configure each piece of equipment every time they sat in front of the computer. Similar concerns are also present in a non-work environment when two users are sharing a device. For example, a television's volume settings may need to be adjusted louder to accommodate the user who is hard of hearing.

There is a need for electronic devices that provide efficient methods and interfaces for making ergonomic environment adjustments. Such techniques can reduce the cognitive burden on a user who needs an adjusted environment, thereby enhancing productivity and health. Further, such techniques can reduce processor and battery power by forgoing making unnecessary (e.g., refinement) ergonomic environment adjustments and only making the ergonomic environment adjustments tailored specific to a user.

Below, FIGS. 1A-1B, 2, 3, 4A-4B, and 5A-5H provide a description of exemplary devices for performing the techniques for making ergonomic environment adjustments. FIGS. 6A-6R illustrate exemplary user environment for making ergonomic environment adjustments. FIGS. 7A-7B is a flow diagram illustrating methods of making ergonomic environment adjustments in accordance with some embodiments. The user environment in FIGS. 6A-6R is used to illustrate the processes described below, including the processes in FIGS. 7A-7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In accordance with some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, In accordance with some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In accordance with some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In accordance with some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In accordance with some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display In accordance with some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display In accordance with some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In accordance with some embodiments, the touch screen has a video resolution of approximately 160 dpi. The user optionally makes contact with touch screen 112 using any suitable object or appendage, such as a stylus, a finger, and so forth. In accordance with some embodiments, the user interface is designed to work primarily with finger-based contacts and gestures, which can be less precise than stylus-based input due to the larger area of contact of a finger on the touch screen. In accordance with some embodiments, the device translates the rough finger-based input into a precise pointer/cursor position or command for performing the actions desired by the user.

In accordance with some embodiments, in addition to the touch screen, device 100 optionally includes a touchpad (not shown) for activating or deactivating particular functions. In accordance with some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In accordance with some embodiments, an optical sensor is located on the back of device 100, opposite touch screen display 112 on the front of the device so that the touch screen display is enabled for use as a viewfinder for still and/or video image acquisition. In accordance with some embodiments, an optical sensor is located on the front of the device so that the user's image is, optionally, obtained for video conferencing while the user views the other video conference participants on the touch screen display. In accordance with some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In accordance with some embodiments, at least one contact intensity sensor is collocated with, or proximate to, a touch-sensitive surface (e.g., touch-sensitive display system 112). In accordance with some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In accordance with some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In accordance with some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In accordance with some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In accordance with some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
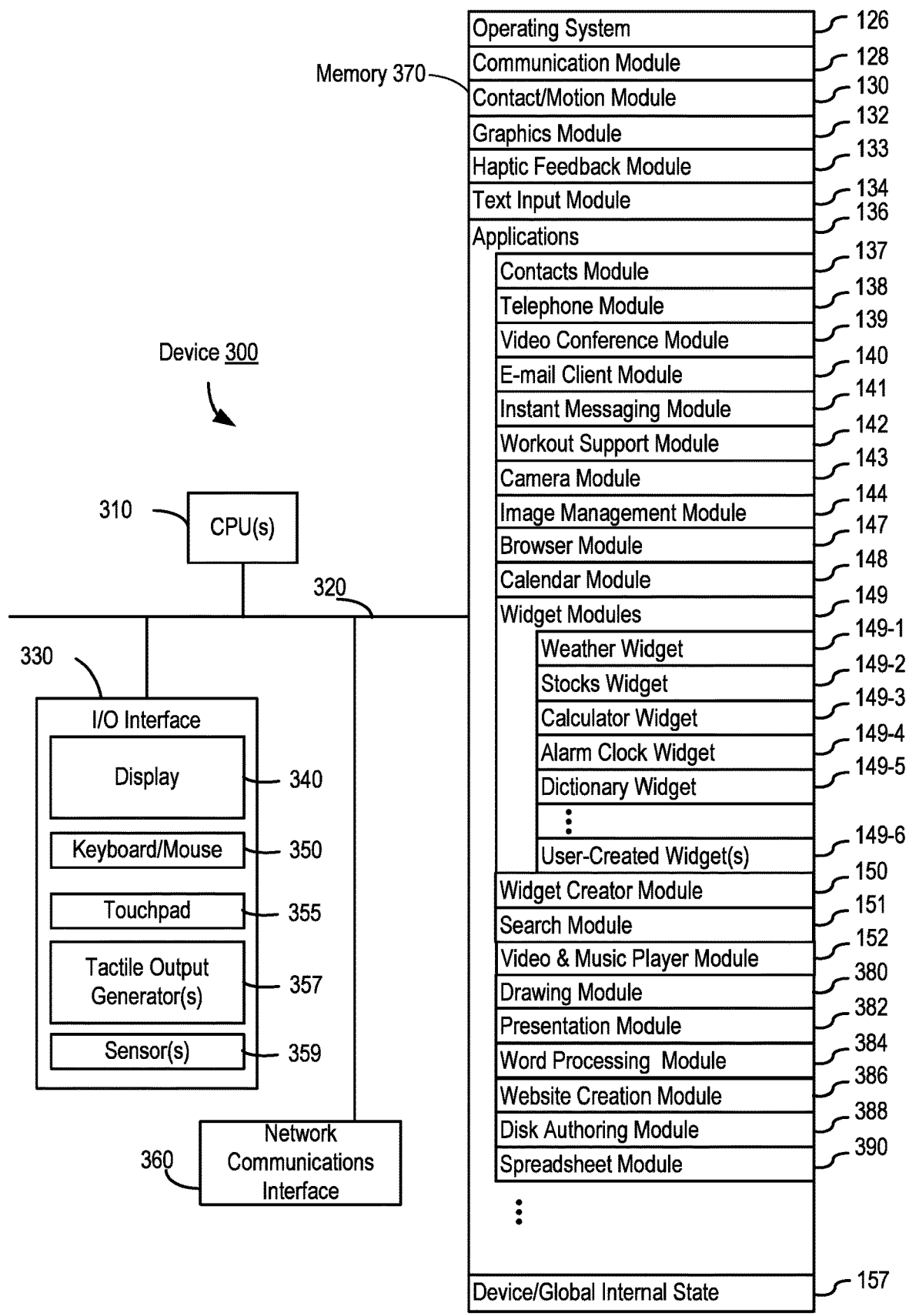
FIG. 3 is a block diagram of an exemplary multifunction device with a display and a touch-sensitive surface in accordance with some embodiments.

In accordance with some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, In accordance with some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In accordance with some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In accordance with some embodiments, contact/motion module 130 and display controller 156 detect contact on a touchpad.

In accordance with some embodiments, contact/motion module 130 uses a set of one or more intensity thresholds to determine whether an operation has been performed by a user (e.g., to determine whether a user has "clicked" on an icon). In accordance with some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In accordance with some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages, and to view received instant messages. In accordance with some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In accordance with some embodiments, a widget includes an HTML (Hypertext Markup Language) file, a CSS (Cascading Style Sheets) file, and a JavaScript file. In accordance with some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In accordance with some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In accordance with some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968, 067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In accordance with some embodiments, memory 102 optionally stores a subset of the modules and data structures identified above. Furthermore, memory 102 optionally stores additional modules and data structures not described above.

In accordance with some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In accordance with some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
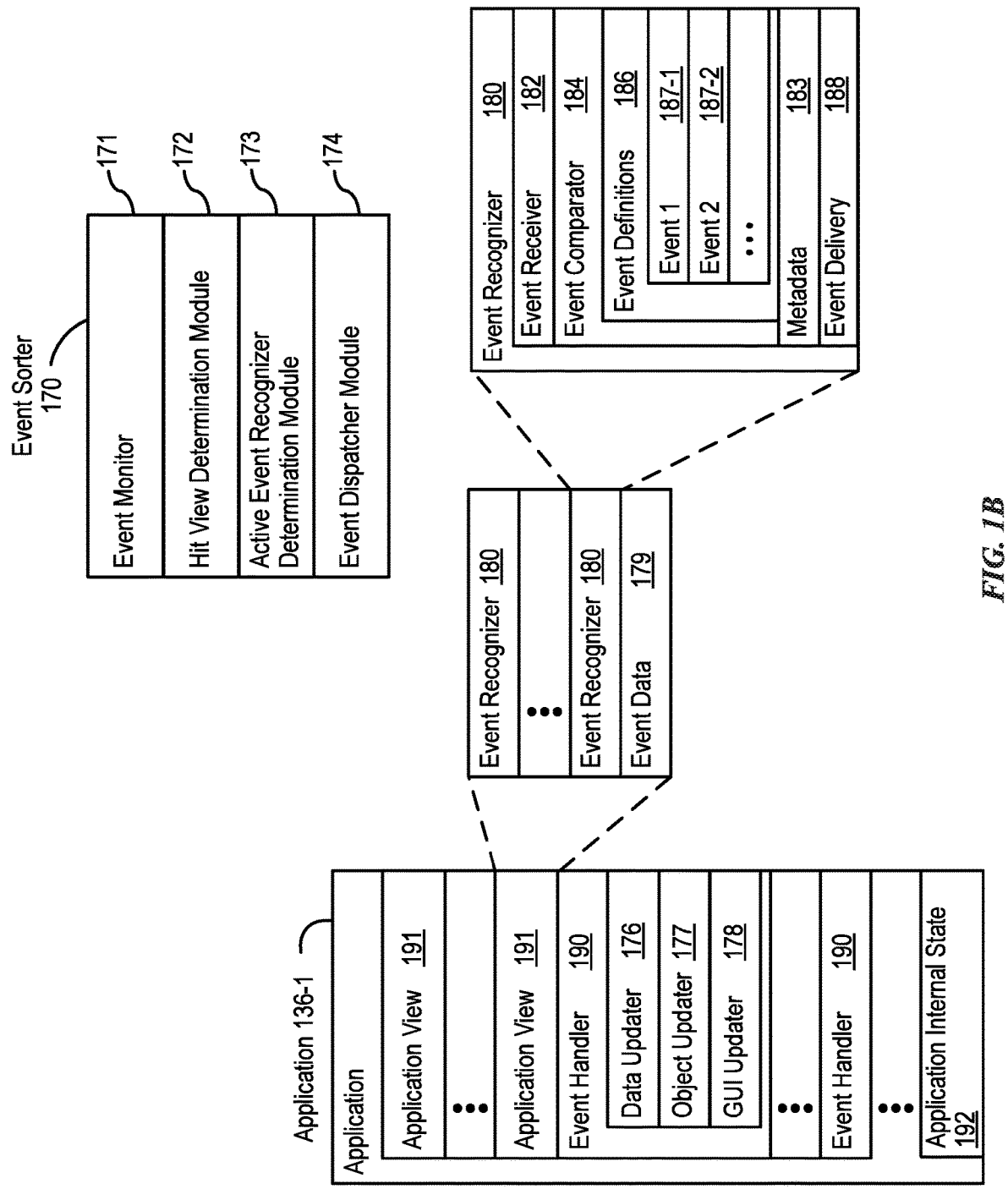
FIG. 1B is a block diagram illustrating exemplary components for event handling in accordance with some embodiments.

FIG. 1B is a block diagram illustrating exemplary components for event handling in accordance with some embodiments. In accordance with some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information.

Event sorter 170 includes event monitor 171 and event dispatcher module 174. In accordance with some embodiments, application 136-1 includes application internal state 192, which indicates the current application view(s) displayed on touch-sensitive display 112 when the application is active or executing. In accordance with some embodiments, device/global internal state 157 is used by event sorter 170 to determine which application(s) is (are) currently active, and application internal state 192 is used by event sorter 170 to determine application views 191 to which to deliver event information.

In accordance with some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In accordance with some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In accordance with some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In accordance with some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In accordance with some embodiments, event dispatcher module 174 stores in an event queue the event information, which is retrieved by a respective event receiver 182.

In accordance with some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In accordance with some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In accordance with some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, In accordance with some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In accordance with some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In accordance with some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In accordance with some embodiments, event comparator 184 includes event definitions 186. Event definitions 186 contain definitions of events (e.g., predefined sequences of sub-events), for example, event 1 (187-1), event 2 (187-2), and others. In accordance with some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In accordance with some embodiments, the event also includes information for one or more associated event handlers 190.

In accordance with some embodiments, event definition 187 includes a definition of an event for a respective user-interface object. In accordance with some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In accordance with some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In accordance with some embodiments, a respective event recognizer 180 includes metadata 183 with configurable properties, flags, and/or lists that indicate how the event delivery system should perform sub-event delivery to actively involved event recognizers. In accordance with some embodiments, metadata 183 includes configurable properties, flags, and/or lists that indicate how event recognizers interact, or are enabled to interact, with one another. In accordance with some embodiments, metadata 183 includes configurable properties, flags, and/or lists that indicate whether sub-events are delivered to varying levels in the view or programmatic hierarchy.

In accordance with some embodiments, a respective event recognizer 180 activates event handler 190 associated with an event when one or more particular sub-events of an event are recognized. In accordance with some embodiments, a respective event recognizer 180 delivers event information associated with the event to event handler 190. Activating an event handler 190 is distinct from sending (and deferred sending) sub-events to a respective hit view. In accordance with some embodiments, event recognizer 180 throws a flag associated with the recognized event, and event handler 190 associated with the flag catches the flag and performs a predefined process.

In accordance with some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In accordance with some embodiments, data updater 176 creates and updates data used in application 136-1. For example, data updater 176 updates the telephone number used in contacts module 137, or stores a video file used in video player module. In accordance with some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In accordance with some embodiments, event handler(s) 190 includes or has access to data updater 176, object updater 177, and GUI updater 178. In accordance with some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
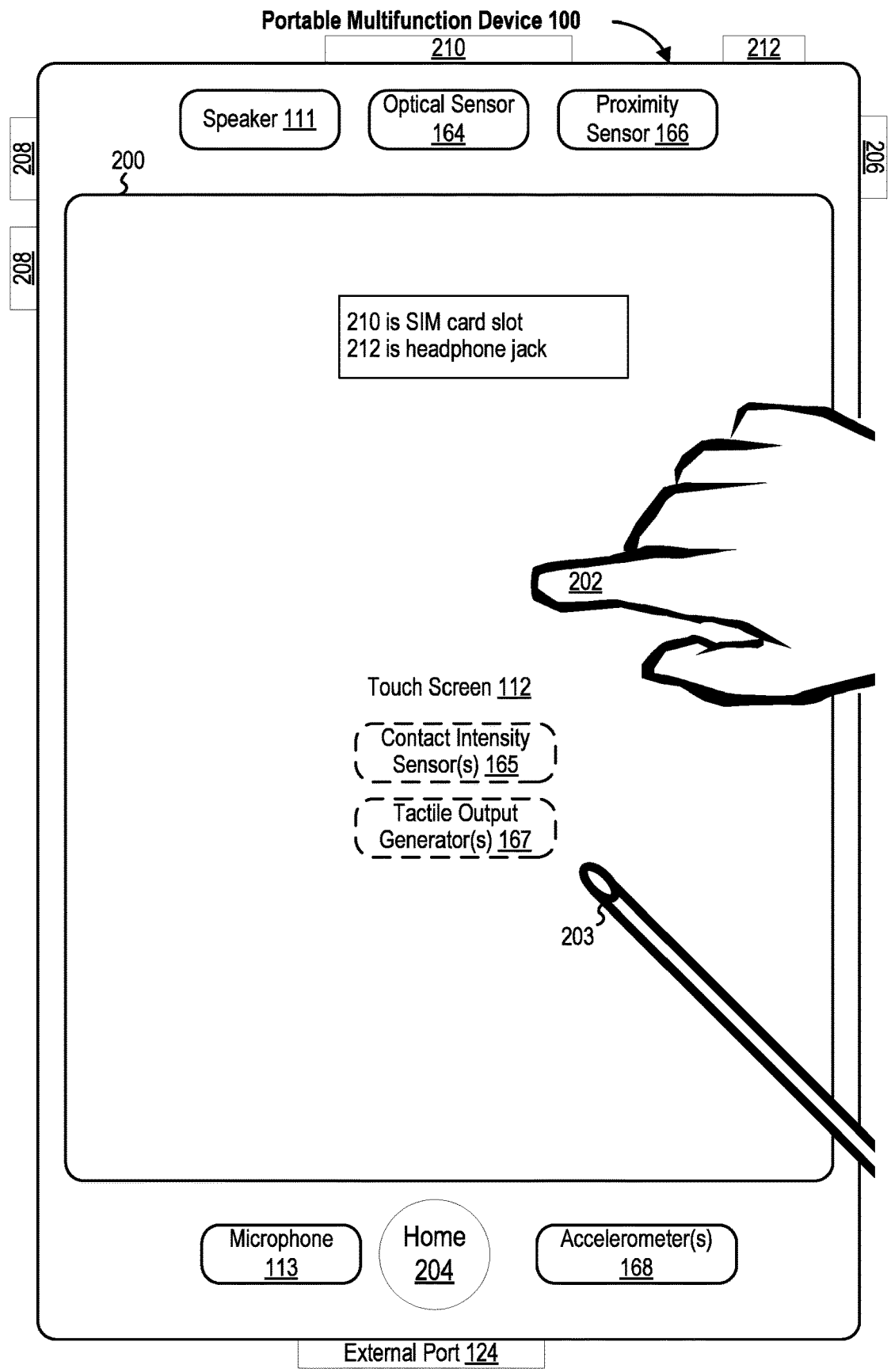
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In accordance with some embodiments, selection of one or more graphics occurs when the user breaks contact with the one or more graphics. In accordance with some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, In accordance with some embodiments, the menu button is implemented as a soft key in a GUI displayed on touch screen 112.

In accordance with some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In accordance with some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In accordance with some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In accordance with some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
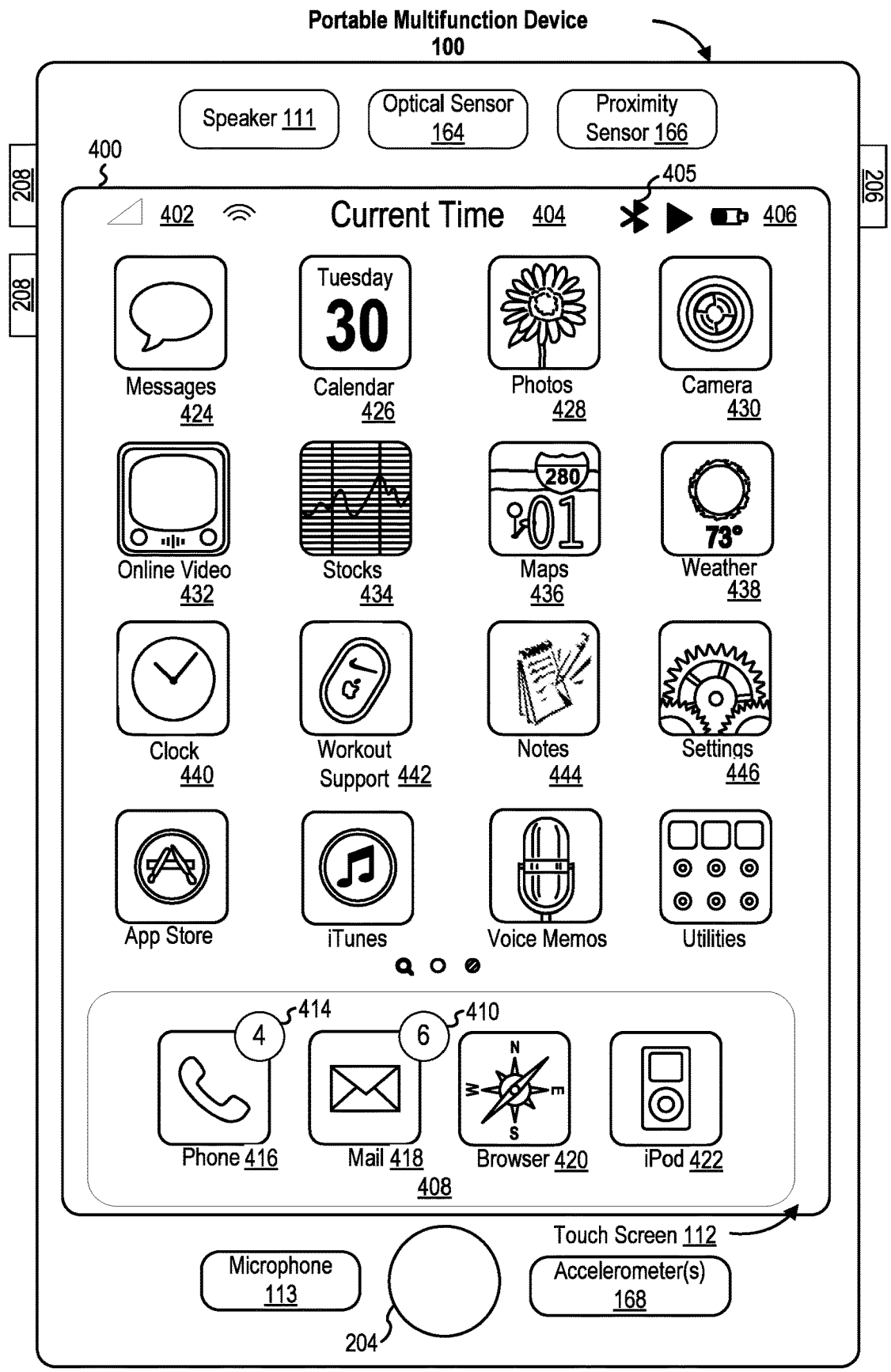
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In accordance with some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In accordance with some embodiments, a label for a respective application icon includes a name of an application corresponding to the respective application icon. In accordance with some embodiments, a label for a particular application icon is distinct from a name of an application corresponding to the particular application icon.

Figure 4B:
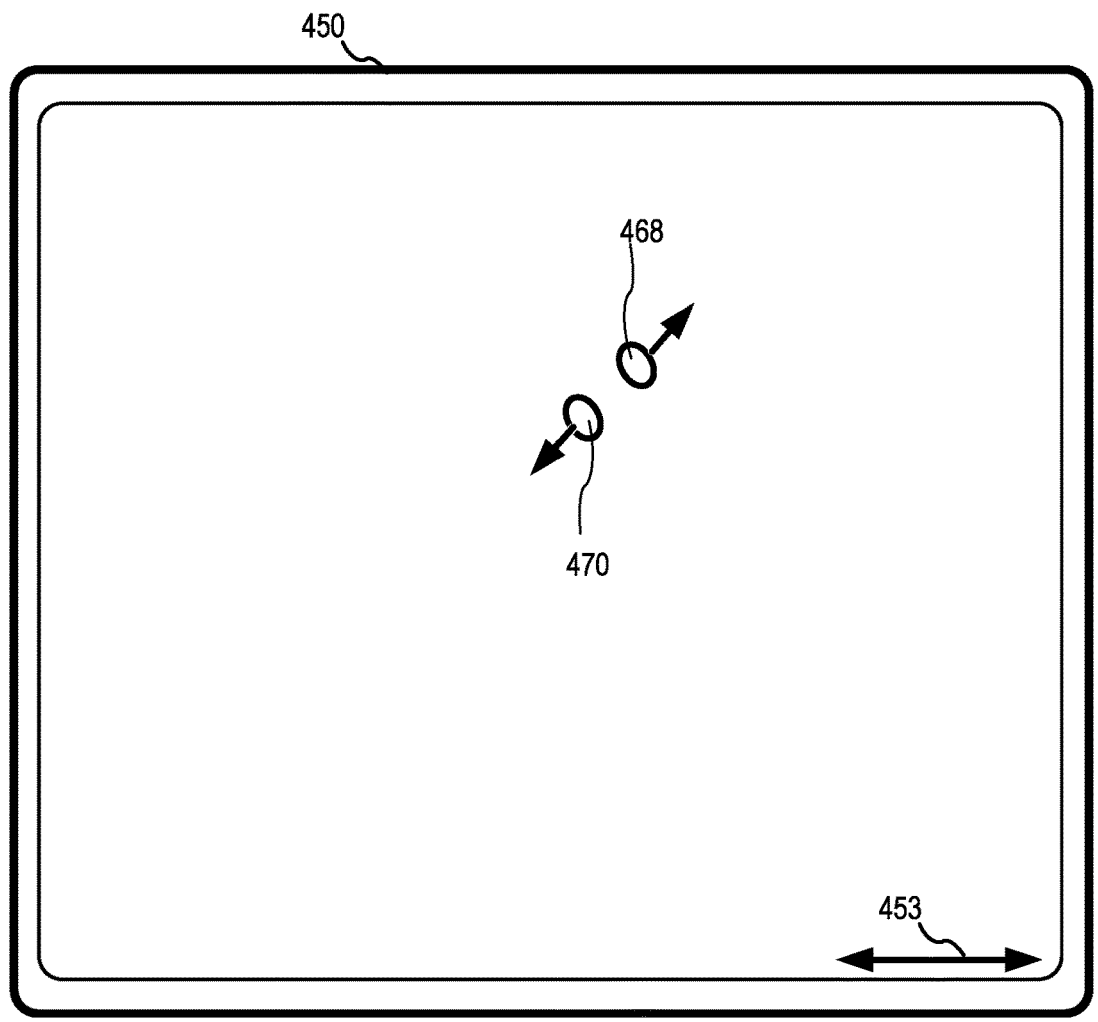
FIG. 4B illustrates an exemplary user interface for a multifunction device with a touch-sensitive surface that is separate from the display in accordance with some embodiments.
Figure 4B:
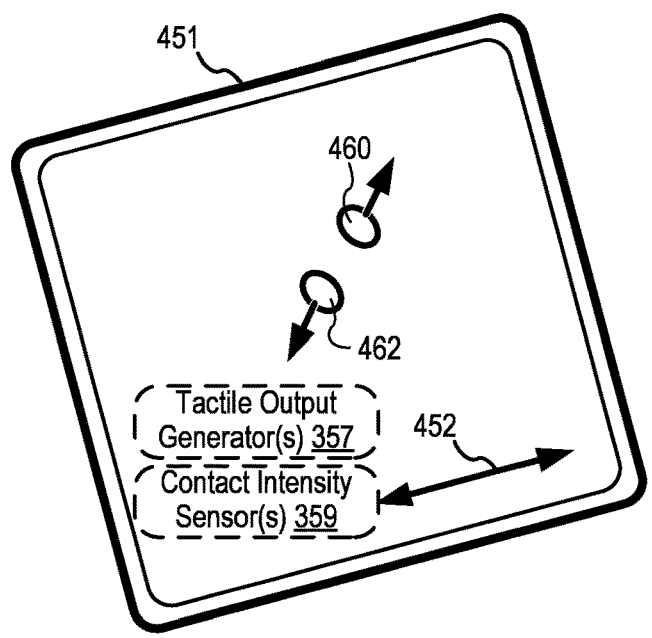

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), In accordance with some embodiments, the device detects inputs on a touch-sensitive surface that is separate from the display, as shown in FIG. 4B. In accordance with some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, In accordance with some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
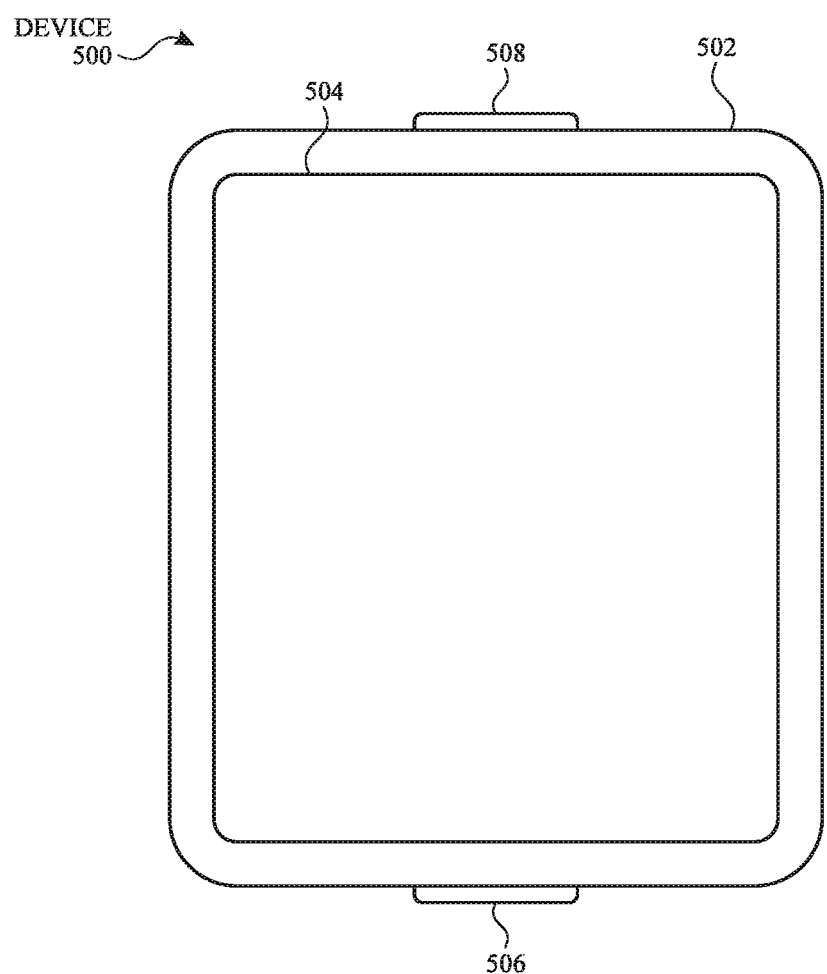
FIG. 5A illustrates a personal electronic device in accordance with some embodiments.
Figure 6A:
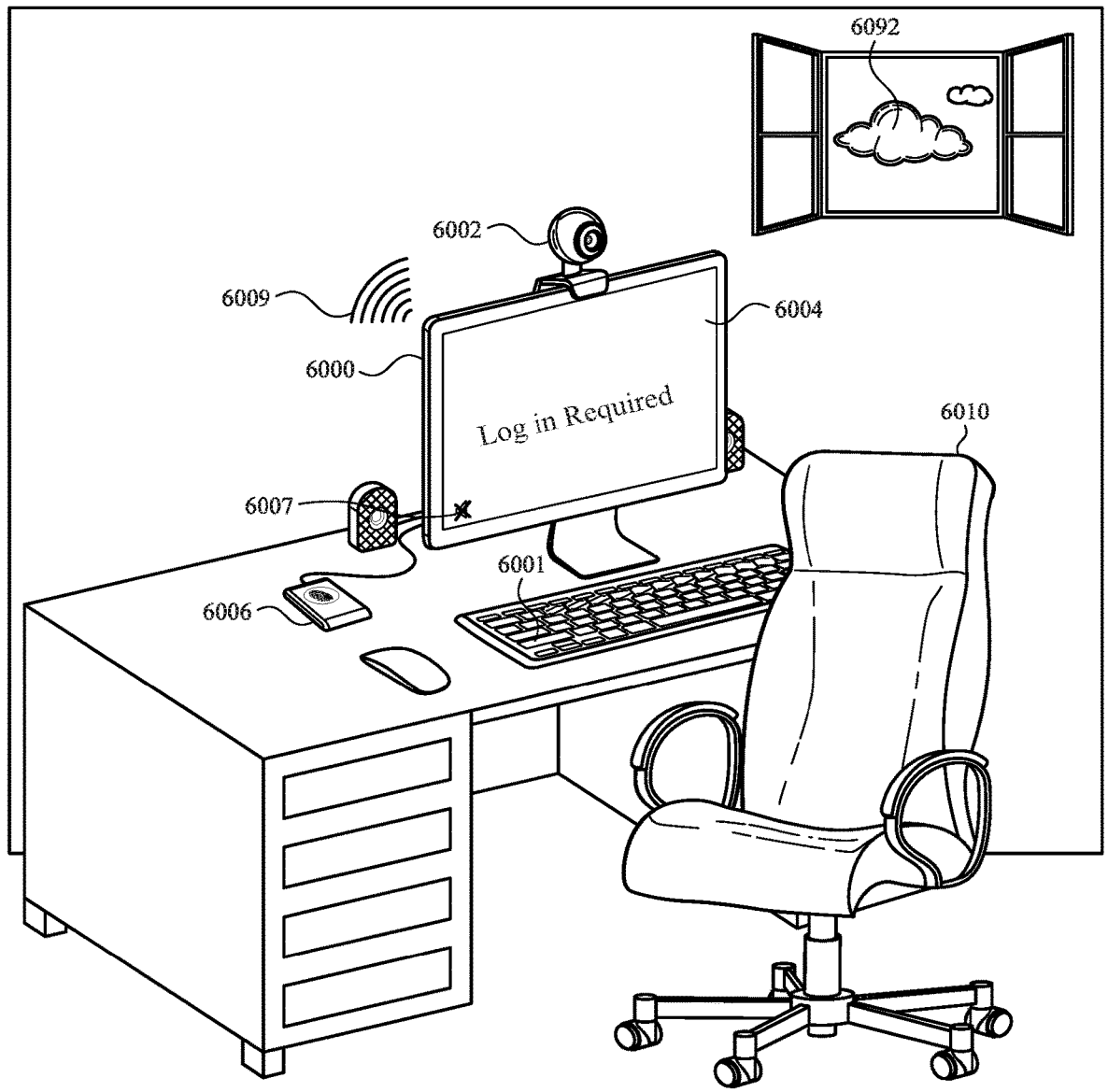
FIG. 6A illustrates a personal electronic device in an office setting in accordance with some embodiments.

FIG. 5A illustrates exemplary personal electronic device 500. Device 500 includes body 502. In accordance with some embodiments, device 500 can include some or all of the features described with respect to devices 100 and 300 (e.g., FIGS. 1A-4B). In accordance with some embodiments, device 500 has touch-sensitive display screen 504, hereafter touch screen 504. Alternatively, or in addition to touch screen 504, device 500 has a display and a touch-sensitive surface. As with devices 100 and 300, In accordance with some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In accordance with some embodiments, device 500 has one or more input mechanisms 506 and 508. Input mechanisms 506 and 508, if included, can be physical. Examples of physical input mechanisms include push buttons and rotatable mechanisms. In accordance with some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In accordance with some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 7000-7026 (FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-B, 3, and 5A-H). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In accordance with some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In accordance with some embodiments, the duration of the contact is used in determining the characteristic intensity (e.g., when the characteristic intensity is an average of the intensity of the contact over time). In accordance with some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In accordance with some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
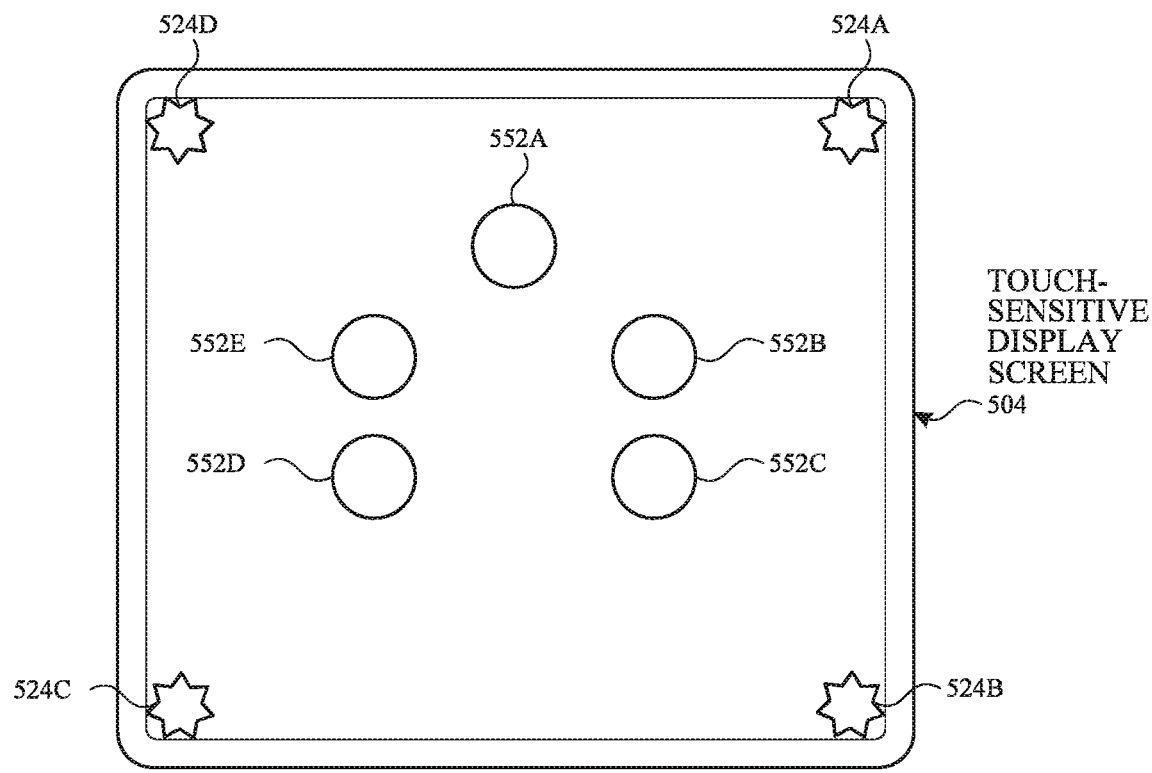
FIGS. 5C-5D illustrate exemplary components of a personal electronic device having a touch-sensitive display and intensity sensors in accordance with some embodiments.
Figure 5C:
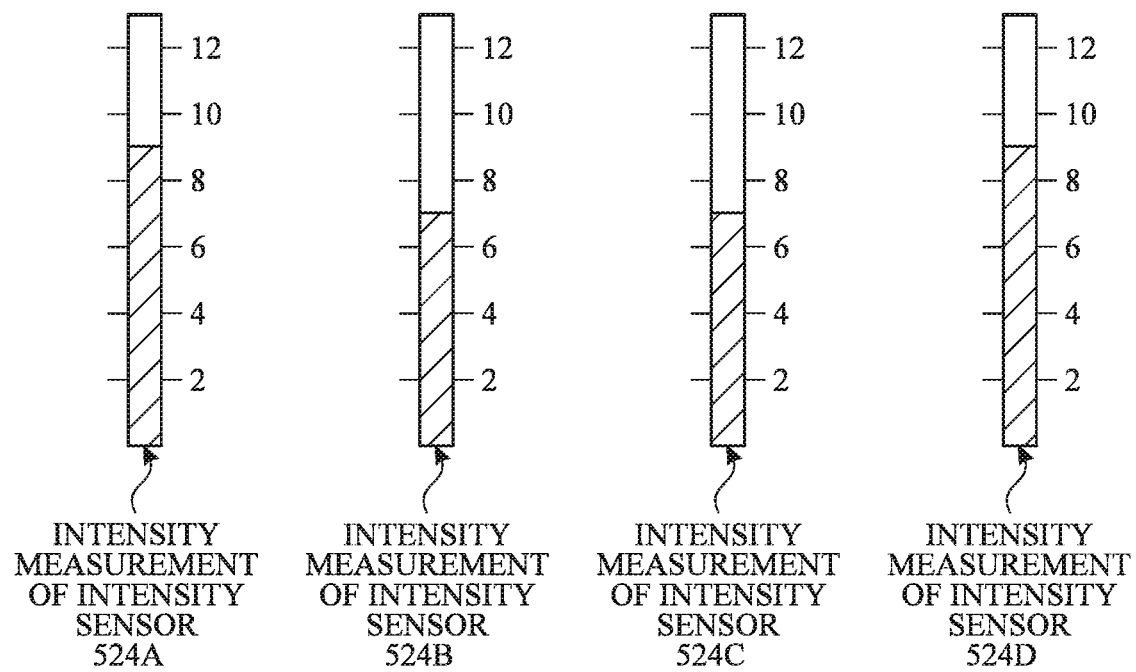
Figure 5D:
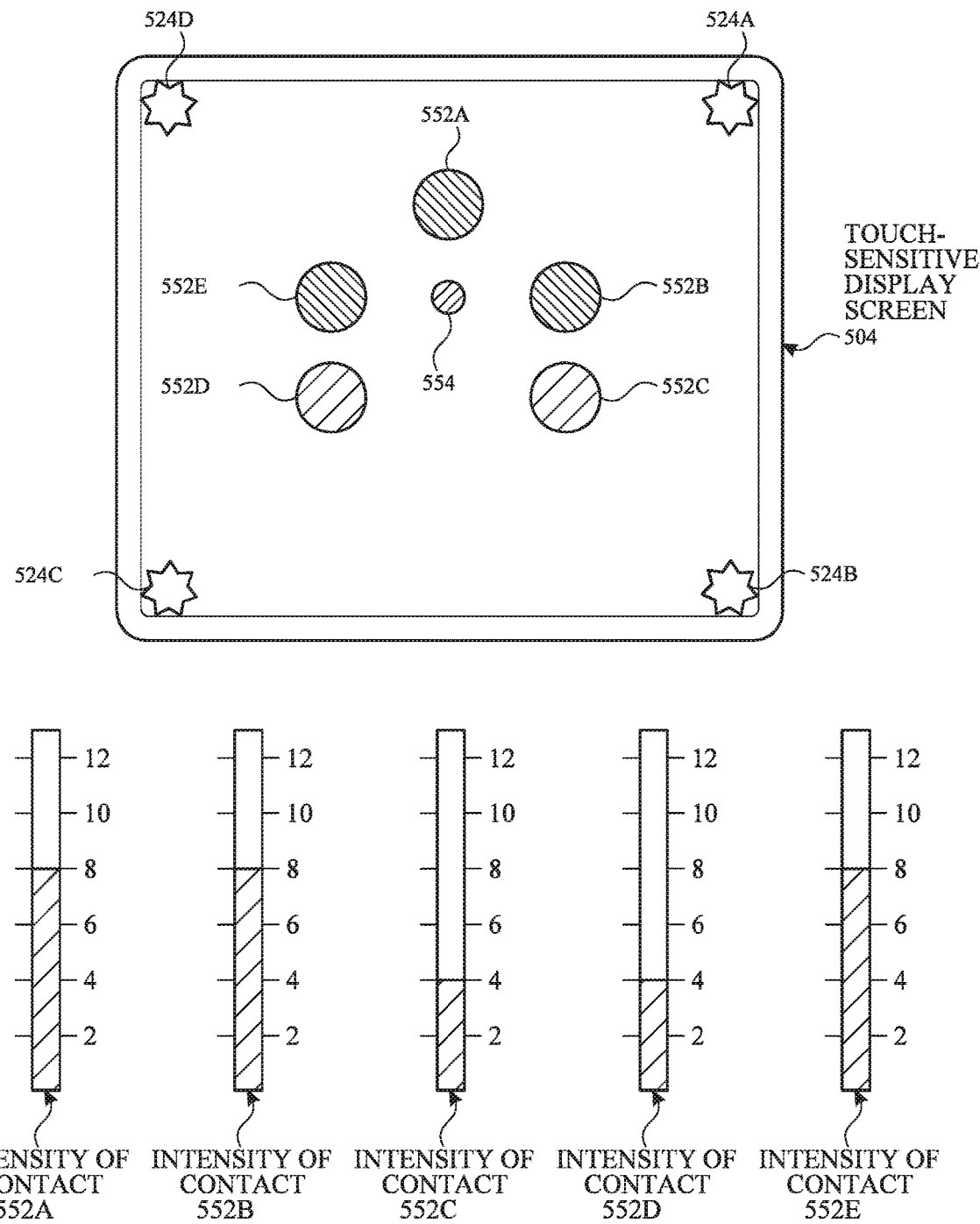

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In accordance with some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In accordance with some embodiments, a characteristic intensity of a contact is based on one or more intensities of the contact. In accordance with some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In accordance with some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In accordance with some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In accordance with some embodiments, the light press intensity threshold corresponds to an intensity at which the device will perform operations typically associated with clicking a button of a physical mouse or a trackpad. In accordance with some embodiments, the deep press intensity threshold corresponds to an intensity at which the device will perform operations that are different from operations typically associated with clicking a button of a physical mouse or a trackpad. In accordance with some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In accordance with some embodiments, the contact-detection intensity threshold is zero. In accordance with some embodiments, the contact-detection intensity threshold is greater than zero.

In accordance with some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In accordance with some embodiments, the respective operation is performed in response to detecting the increase in intensity of the respective contact above the press-input intensity threshold (e.g., a "down stroke" of the respective press input). In accordance with some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
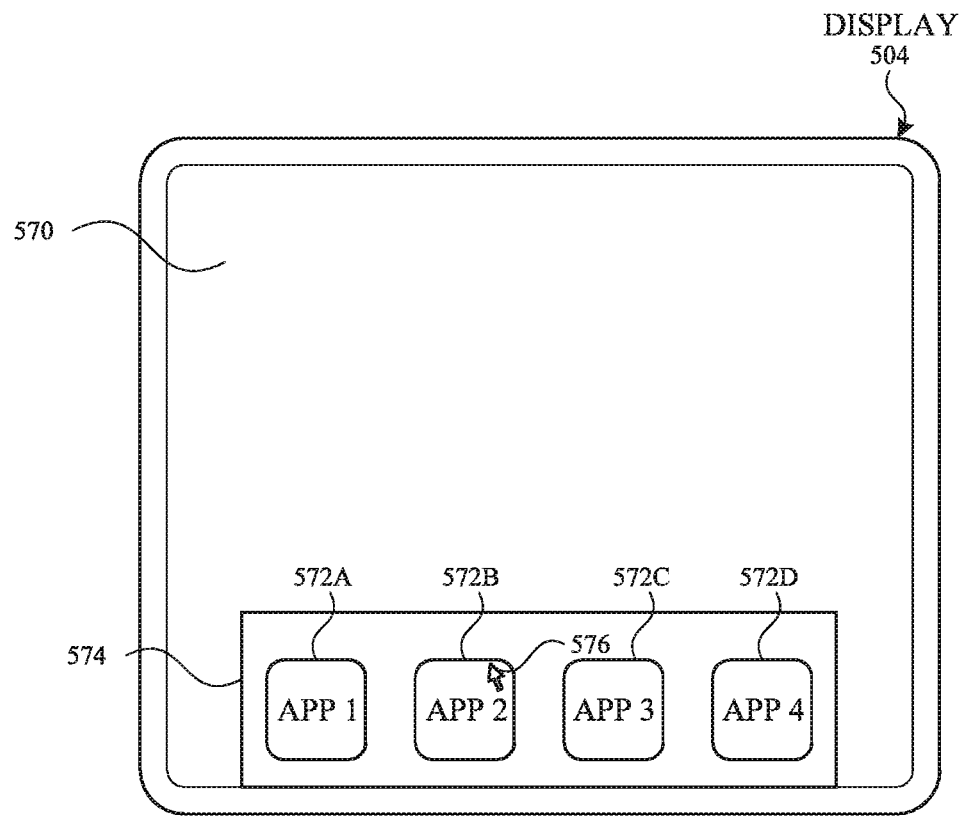
FIGS. 5E-5H illustrate exemplary components and user interfaces of a personal electronic device in accordance with some embodiments.
Figure 5E:
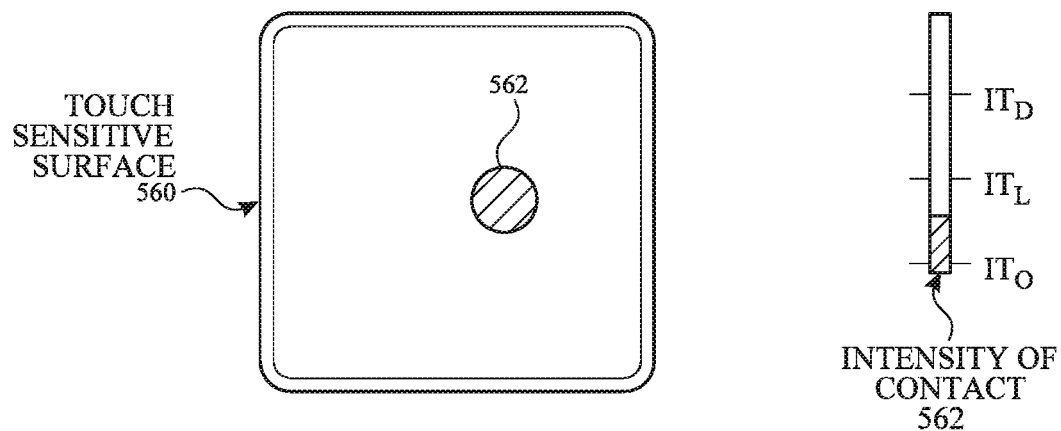
Figure 5F:
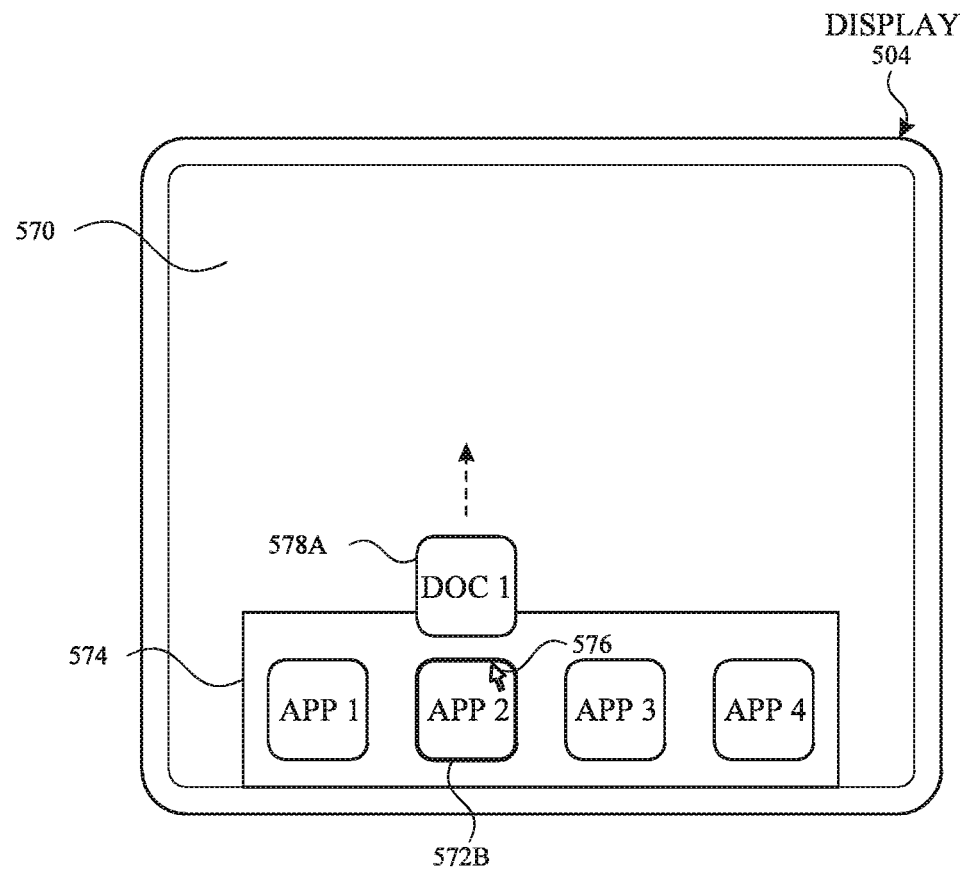
Figure 5F:
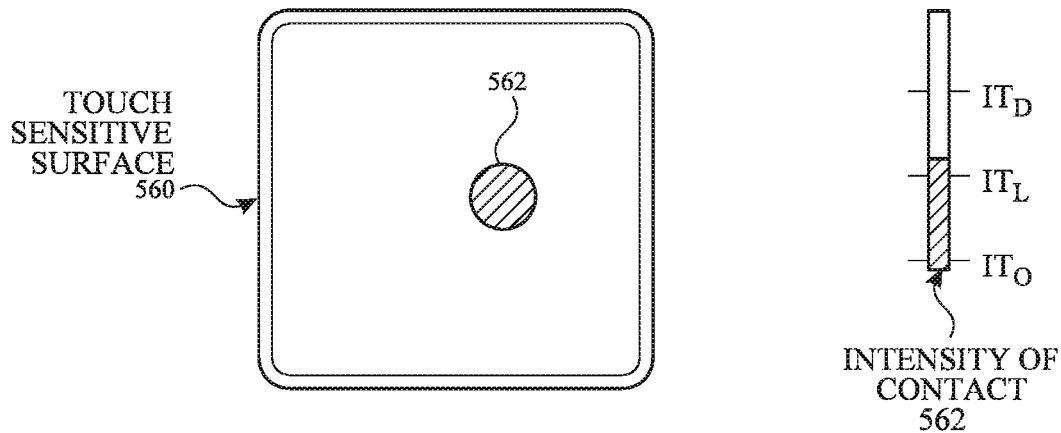
Figure 5G:
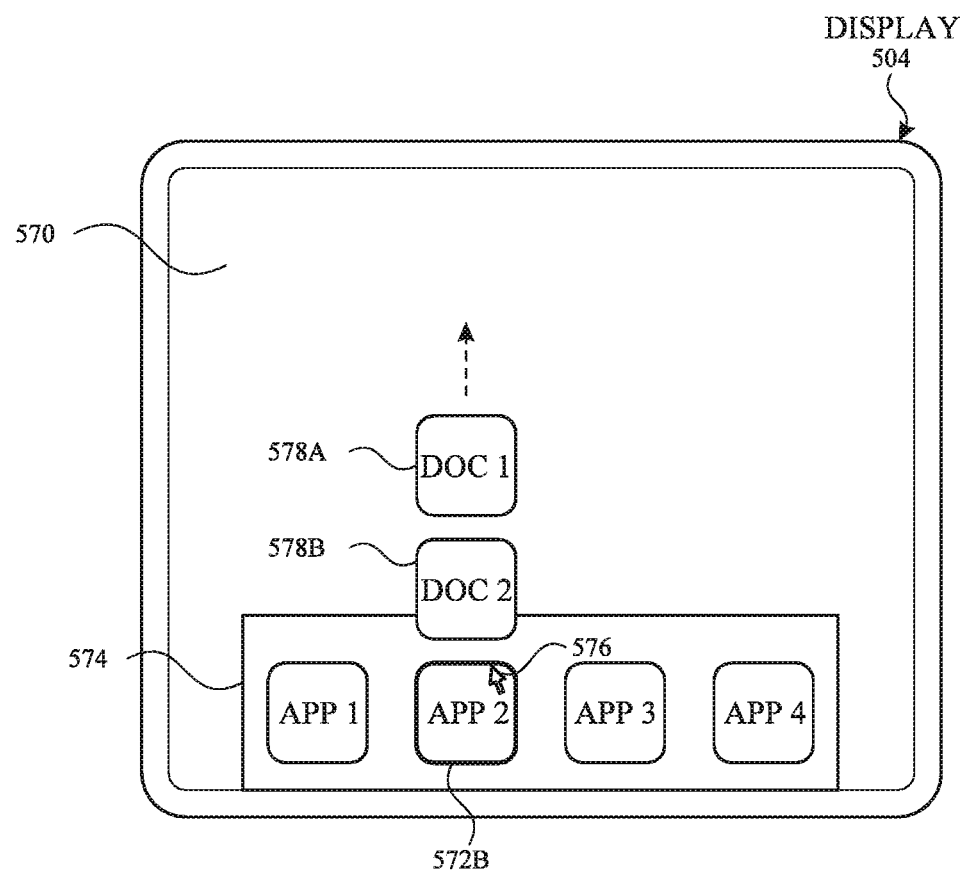
Figure 5G:
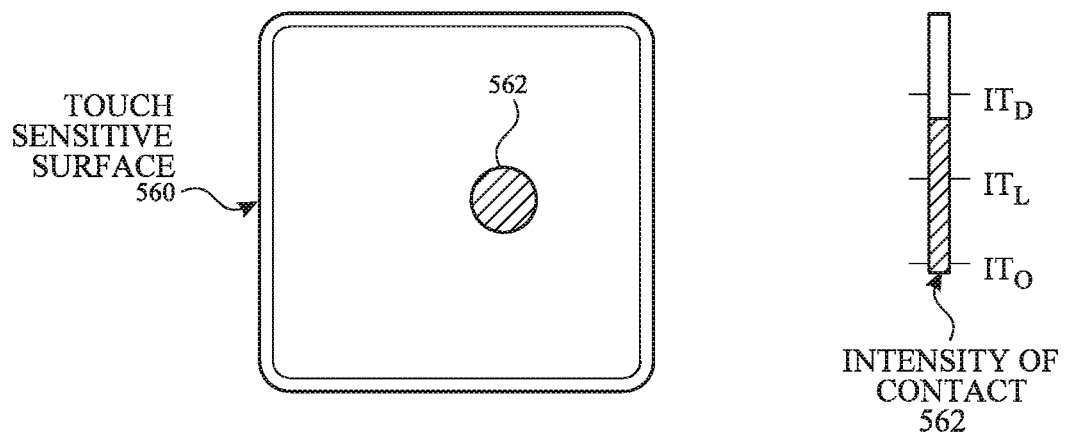
Figure 5H:
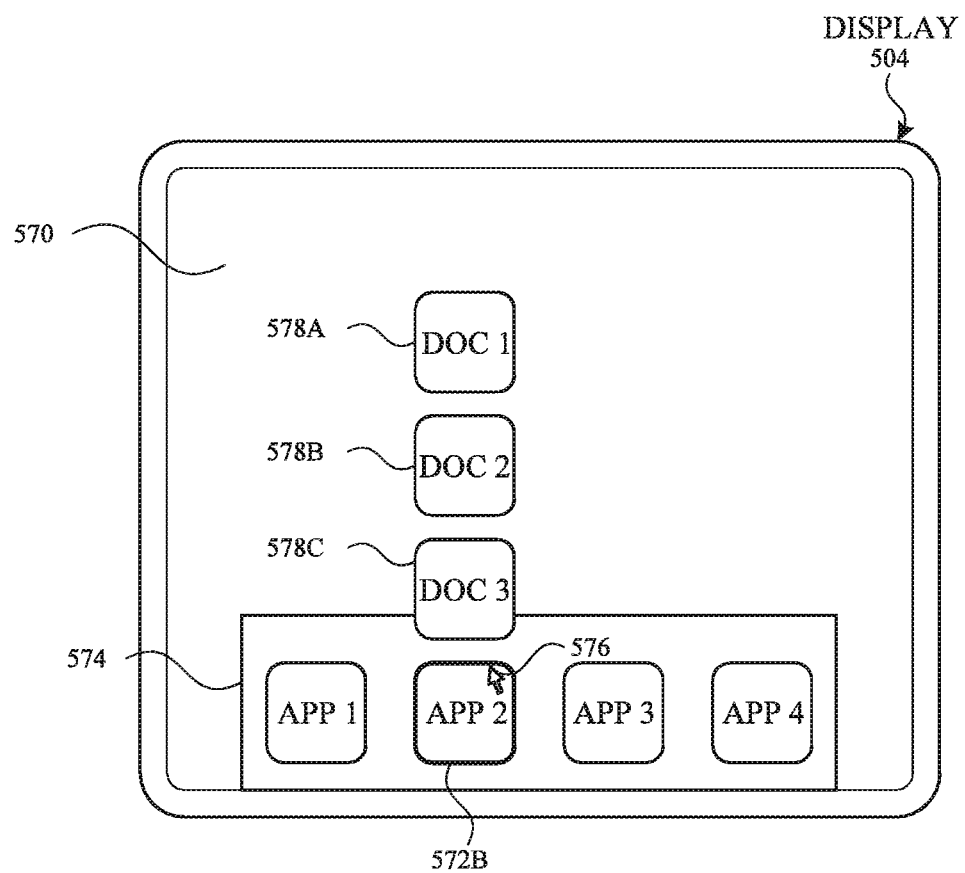
Figure 5H:
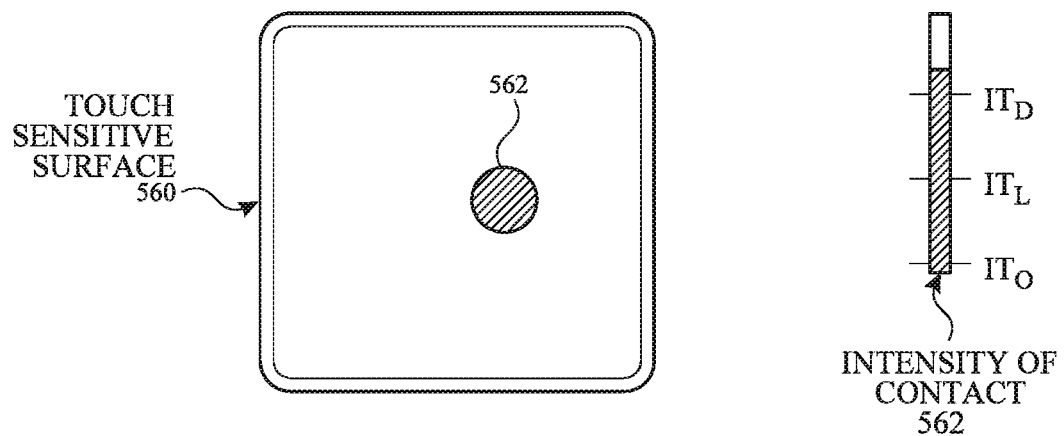

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In accordance with some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In accordance with some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In accordance with some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In accordance with some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In accordance with some embodiments, the intensity, on which the progress of the animation is based, is the characteristic intensity of the contact. The operations described with reference to FIGS. 5E-5H can be performed using an electronic device similar or identical to device 100, 300, or 500.

In accordance with some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, In accordance with some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, In accordance with some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6R illustrate exemplary methods, devices and systems for managing an ergonomic environment in accordance with some embodiments. The ergonomic environment in these figures is used to illustrate the processes described below, including the processes in FIGS. 7A-7B.

FIG. 6A illustrates an exemplary office environment. The office environment includes an electronic device 6000 with a first input mechanism, a keyboard 6001, and a second input mechanism, a camera 6002. The electronic device also includes a display 6004, finger print reader 6006, speakers, a mouse, a volume control as represented by 6007 and a communication device as represented by 6009. The electronic device also includes the chair 6010 and, in accordance with some embodiments, the desk. In accordance with some embodiments the electronic device includes an RF antenna, personal area network adaptor, and local area network adaptor. In accordance with some embodiments, the electronic device is a phone, tablet, or vehicle.

FIG. 6A further illustrates a window within the office and cloudy conditions (e.g., 6092) outside of the window. The window allows for natural light to enter the working environment.

Figure 6B:
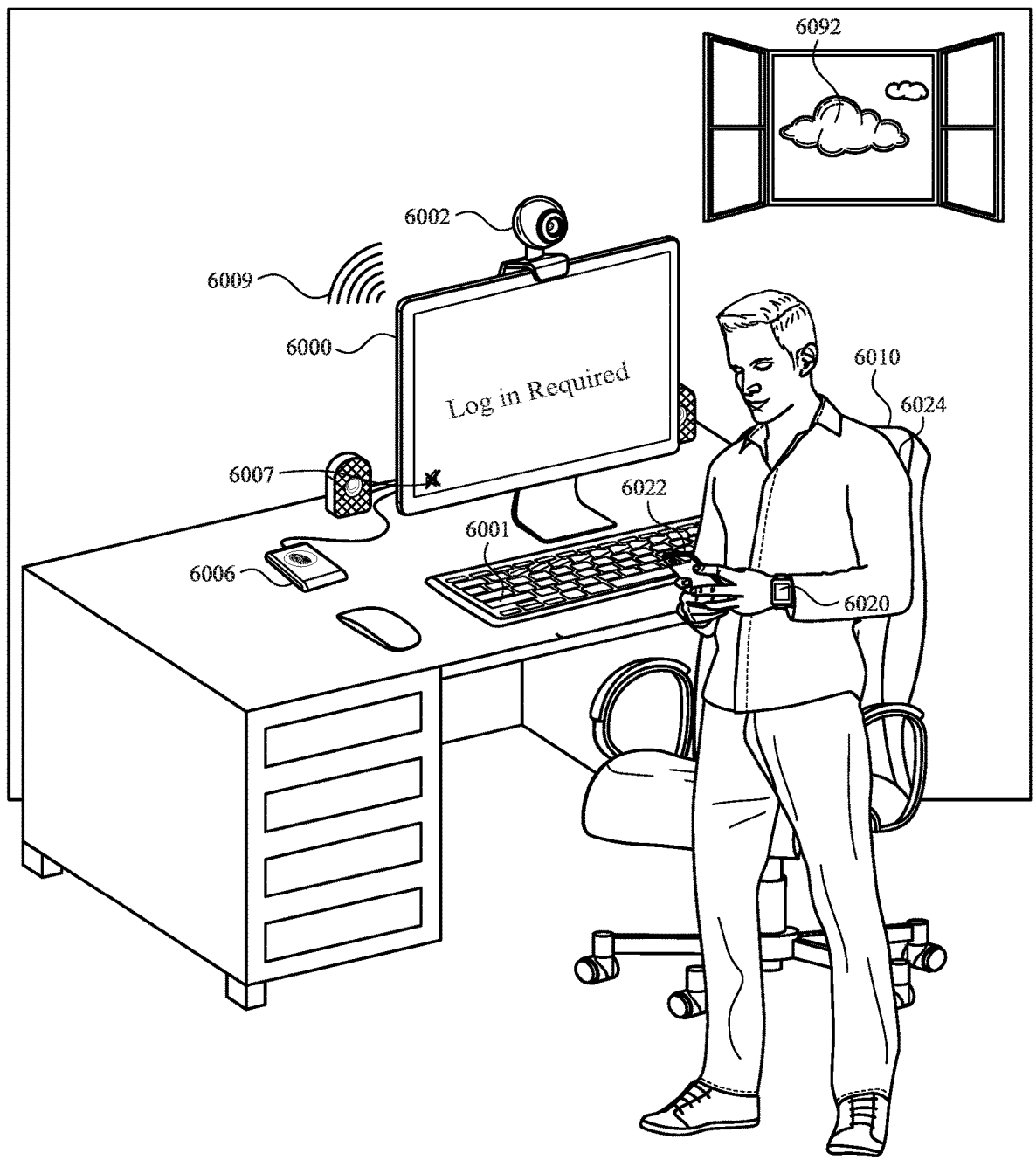
FIG. 6B illustrates a first user entering an office environment in accordance with some embodiments.

FIG. 6B illustrates a user, Chris 6024, entering the office environment to begin his work day. FIG. 6B also show that Chris is wearing his wearable device 6020 (e.g., watch) and using his mobile device 6022. Because Chris has just entered his office, Chris has not yet been authorized to use the electronic device 6000. Consequently, the electronic device 6000 displays, on the display 6004: "Log in Required."

Figure 6C:
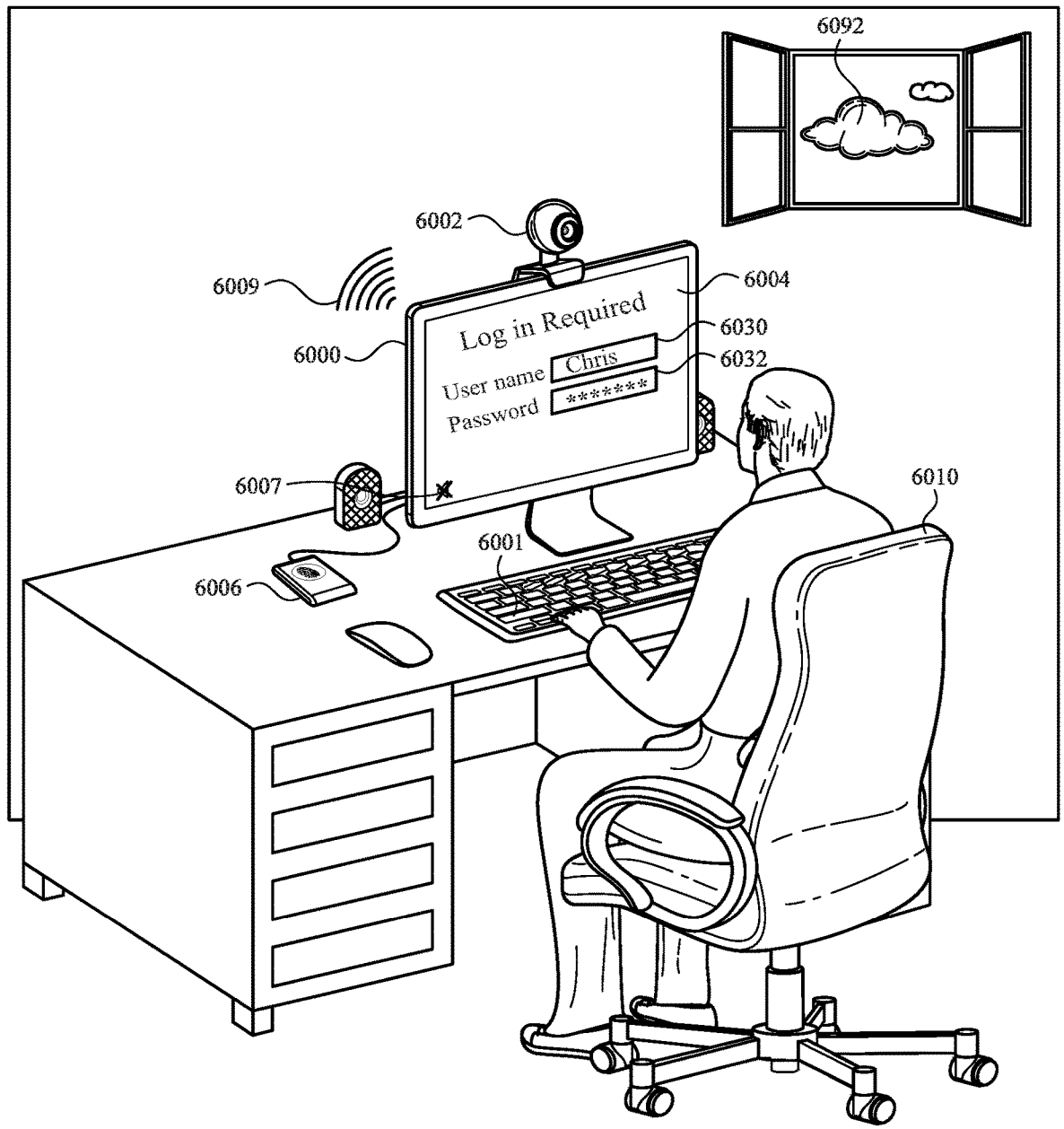
FIGS. 6C-6G illustrates making an ergonomic adjustments for a first user in accordance with some embodiments.

FIG. 6C illustrates Chris sitting down in the chair 6010 and starting to use the electronic device 6000. The electronic device 6000 receives via the keyboard 6001 Chris' user identifier information, more specifically his username 6030 and password 6032. In accordance with some embodiments, Chris' user identifier information is received via one of an RF antenna, fingerprint sensor 6006, personal area network adaptor, and a local area network adaptor 6009. In accordance with some embodiments, the user identification information is one or more of an image, a series of images, username 6030, password 6032, pin code, fingerprint, and an identifier of a connectivity request.

Figure 6D:
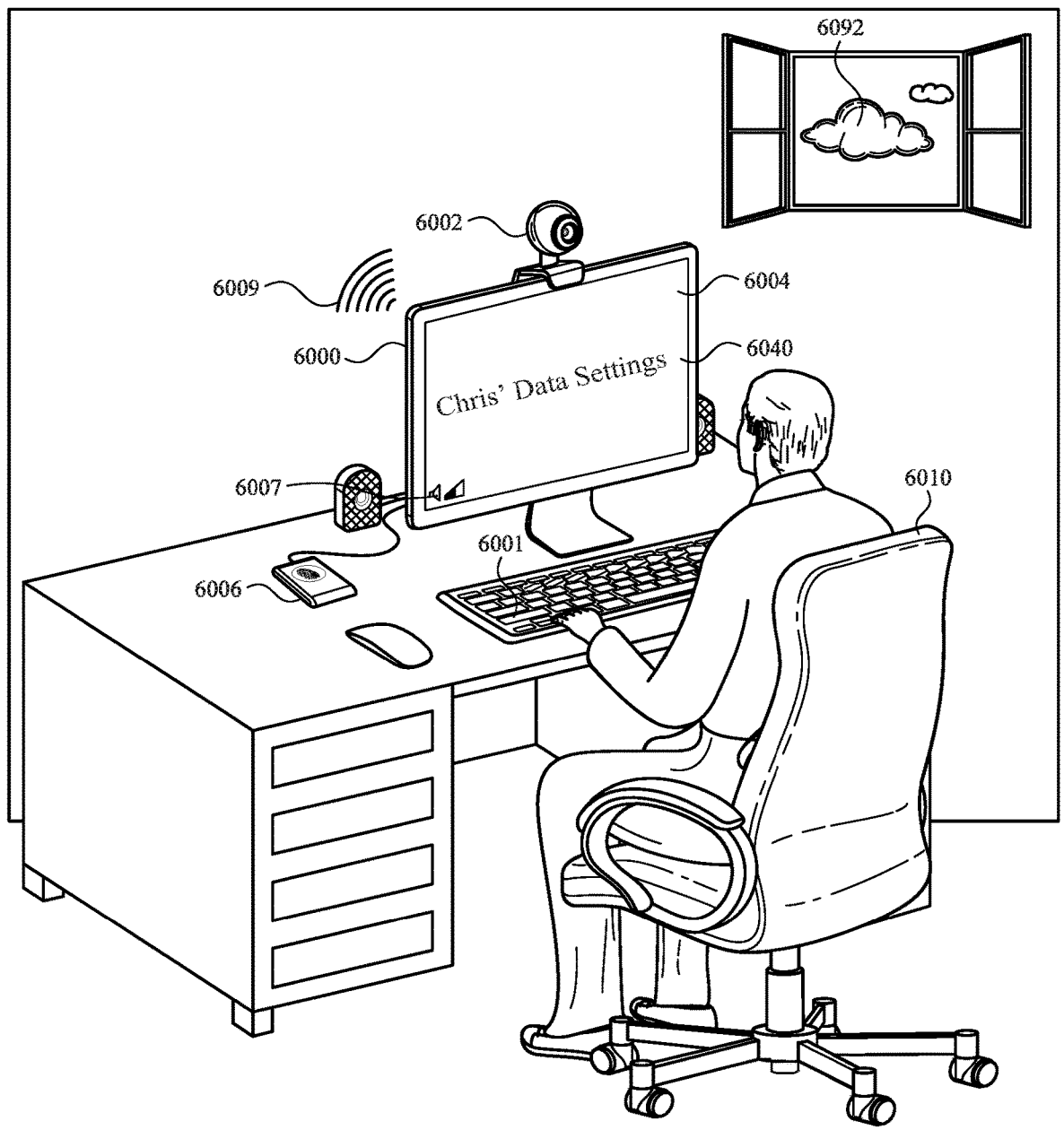

FIG. 6D illustrates Chris successfully logging into the electronic device 6000. Chris' successful log-in is predicated on the electronic device 6000 determining that Chris' user identifier information (e.g., 6030 and 6032) corresponds to a first data access control profile. In accordance with electronic device 6000 determining that Chris is an authorized user, data access control parameters on the electronic device are configured using Chris' data access control profile (e.g., 6040 representing Chris' personal data settings). In accordance with some embodiments, the data access control profile is one of personal security settings, data accessibility settings, data accessibility settings, and browser settings. In some examples, the first data access control profile includes a data setting corresponding to a grant of access (e.g., read, write, delete) to a resource (e.g., a file, disk drive, memory, network port). In accordance with some embodiments, the data setting is at least one of log-in security settings, network security settings, theme settings, web-browser cookie data and settings, web-browser homepage settings, web-browser bookmark settings, media content access settings, password data, data identifying language and character set, and a list of available plug-ins.

Figure 6E:
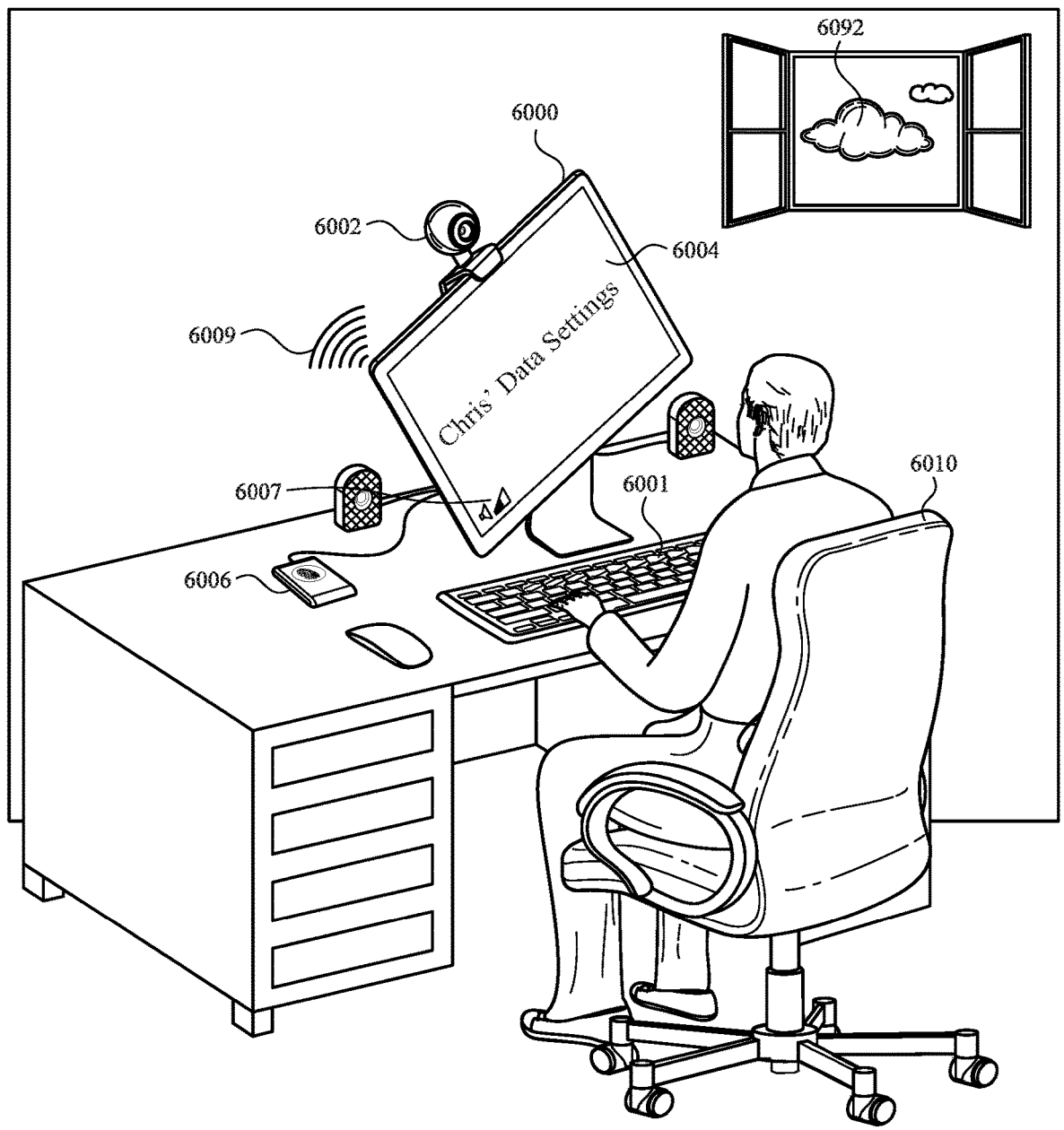
Figure 6F:
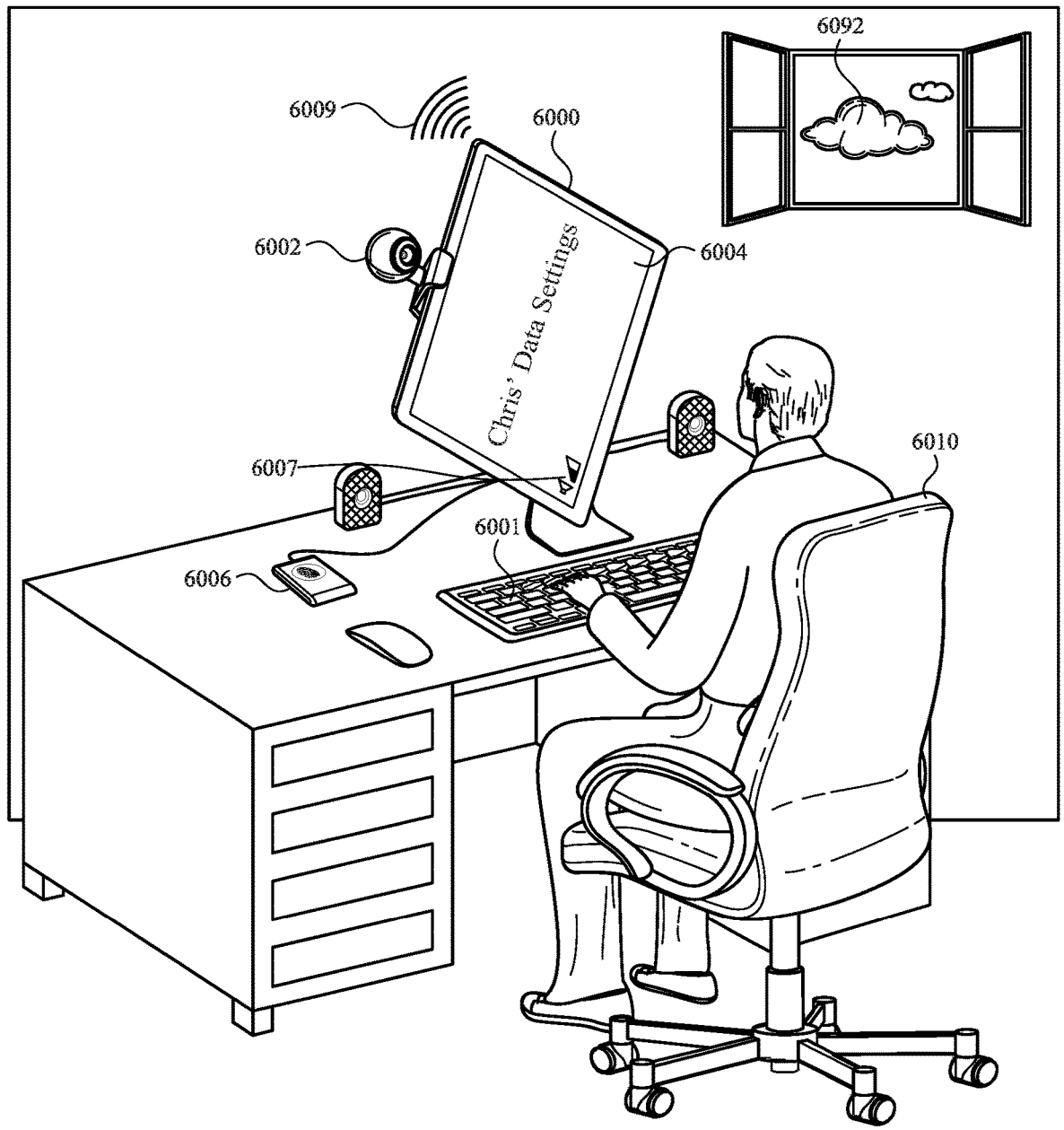
Figure 6G:
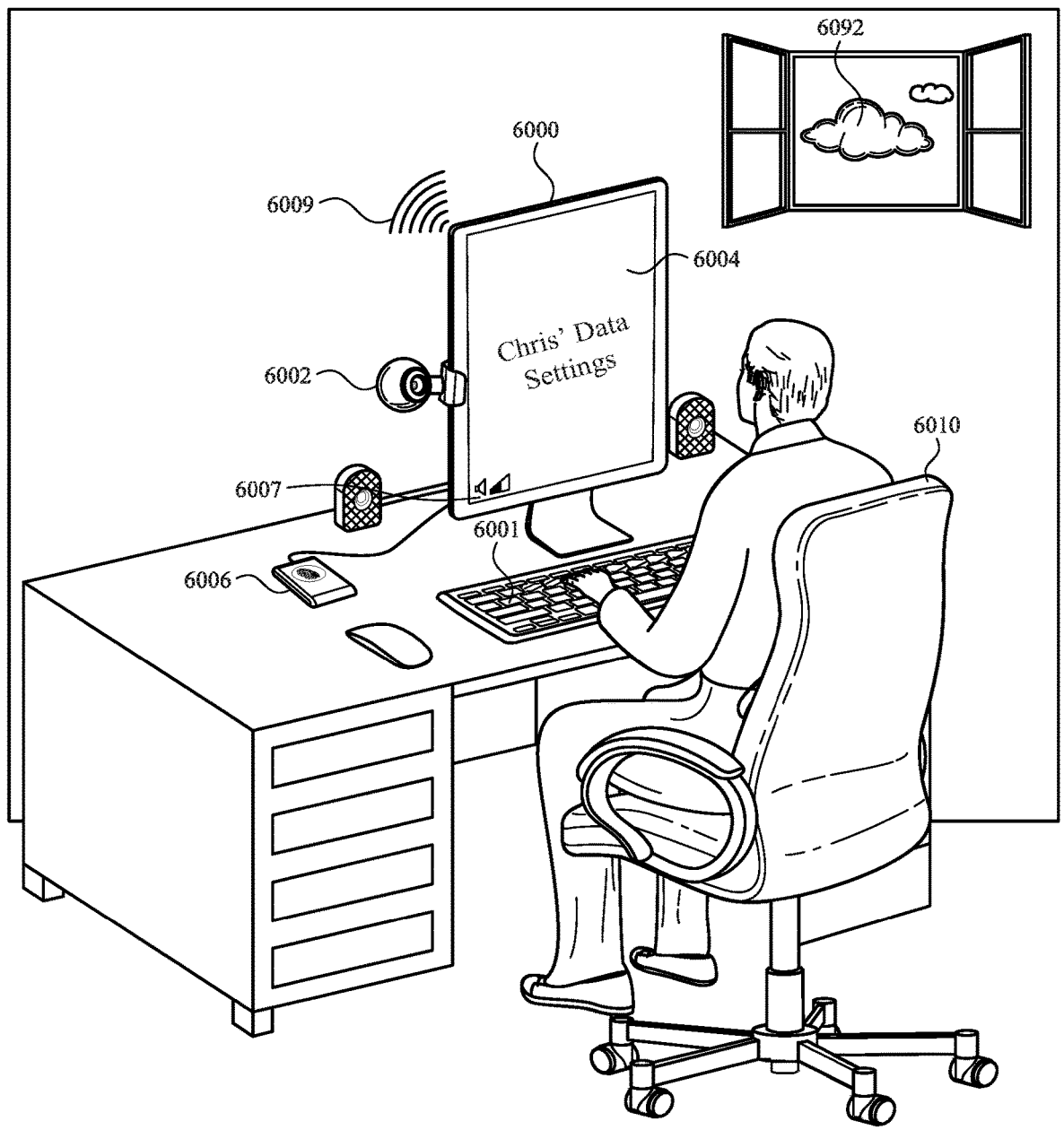

FIGS. 6E-6G illustrate the electronic device 6000 configuring an operating environment for Chris using a first operating environment profile. In accordance with some embodiments, the operating environment is the ergonomic environment. As exemplified in FIGS. 6E-6G, Chris' chair 6010 is gradually raised to a predetermined position and Chris' display 6004 is rotated 90 degrees corresponding to Chris' operating environment profile. Additionally, the device's 6000 volume setting (e.g., 6007 representing the electronic device's volume setting) is also configured and set according to Chris' operating environment profile (e.g., preconfigured settings).

Figure 6H:
FIG. 6H illustrates a user walking away from the desk while maintaining the ergonomic environment in accordance with some embodiments.

FIG. 6H illustrates Chris stepping away from the desk, but remaining in the vicinity of the electronic device. In accordance with some embodiments, Chris may walk out of the office, or decide to just stand up for period of time. While Chris is away from the desk, the electronic device 6000 remains configured using Chris' access control profile (e.g., as exemplified by "Chris' Settings" on display 6004). In accordance with some embodiments, the operating environment (e.g., ergonomic environment) also remains configured for Chris even though Chris is no longer at the desk. In accordance with some embodiments, the electronic device 6000 would time-out after a predetermined amount (e.g., 5, 15, 30 minutes after detecting Chris stepping away from the desk) of time and locks the electronic device 6000 (e.g., no longer provides access to data in accordance with Chris' access control profile). In accordance with some embodiments, once the electronic device 6000 has been locked, the operating environment reverts to a default position.

Figure 6I:
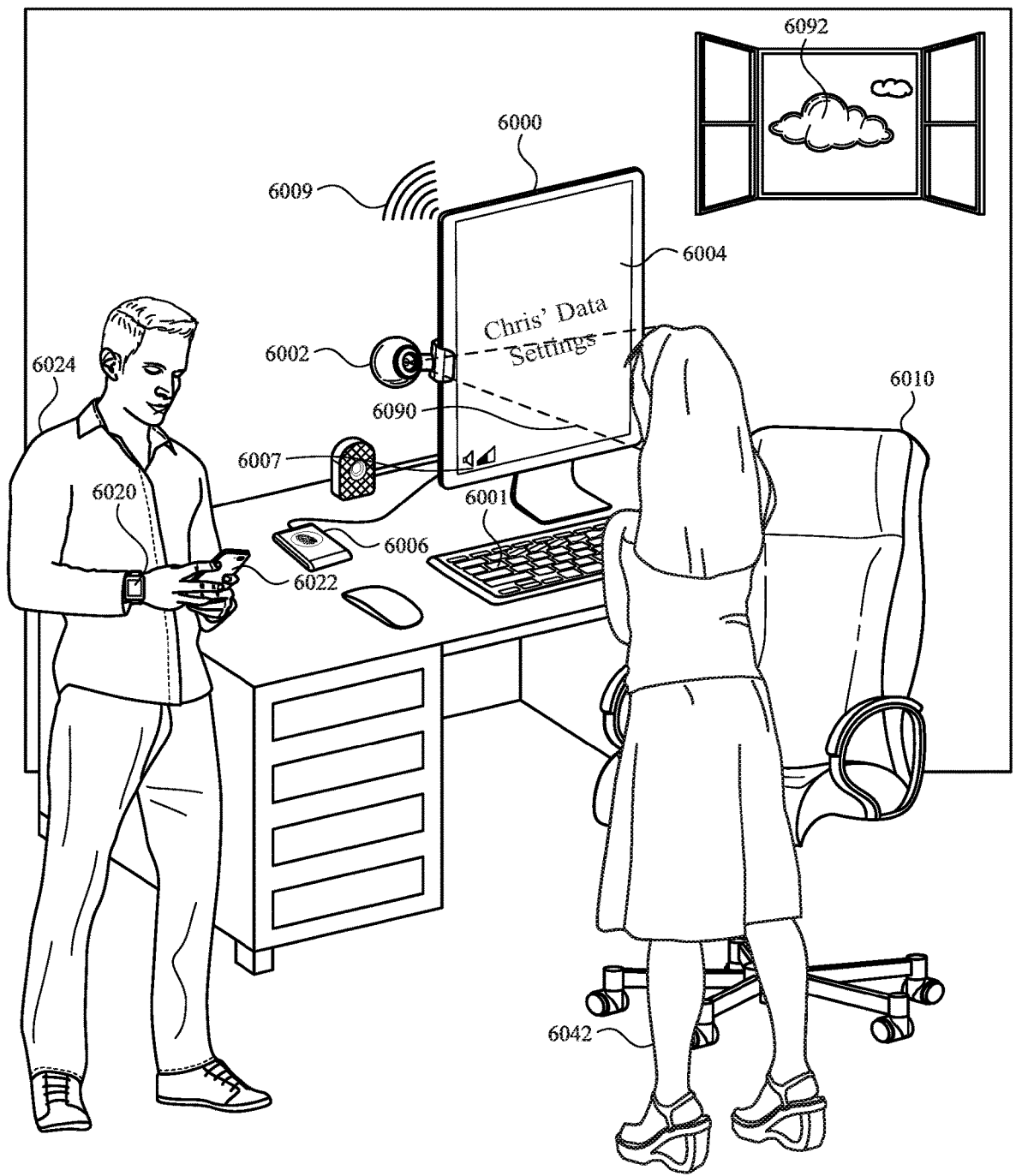
FIG. 6I illustrates a second user entering an office environment in accordance with some embodiments.

FIG. 6I illustrates the electronic device 6000 receiving, via the second input mechanism (e.g., a camera 6002) different from the first input mechanism 6001, a second user identifier (e.g., an image of the user 6042 in a field of view 6090 of the camera 6002) while the electronic device 6000 remains configured using the first data access control profile (e.g., Chris' profile). More specifically, the electronic device 6000 recognizes that a second user 6042, Sasha, is now in the vicinity of the electronic device because the electronic device's camera 6002 captures an image of Sasha in the camera's field of view 6090. In accordance with some embodiments, the second input mechanism is the keyboard 6001, RF receiver, fingerprint sensor 6006, personal area network adaptor, or local area network adaptor 6009. In accordance with some embodiments, because Chris is no longer sitting at his desk, but is still logged into the electronic device 6000, the electronic device 6000 determines whether to change the operating environment (e.g., ergonomic environment) to those of the identified second user, in this case Sasha's settings. In accordance with some embodiments, a remote server, not the electronic device, determines whether the second user identifier corresponds to the second data access control profile.

In accordance with some embodiments, the first input mechanism (e.g., 6001) and the second input mechanism (e.g., 6002) are independently selected from the group consisting of at least one of a keyboard (e.g., 6001), radio receiver, a fingerprint sensor (e.g., 6006), camera (e.g., 6002), a personal area network adaptor, and a local area network adaptor (e.g., 6009).

Figure 6J:
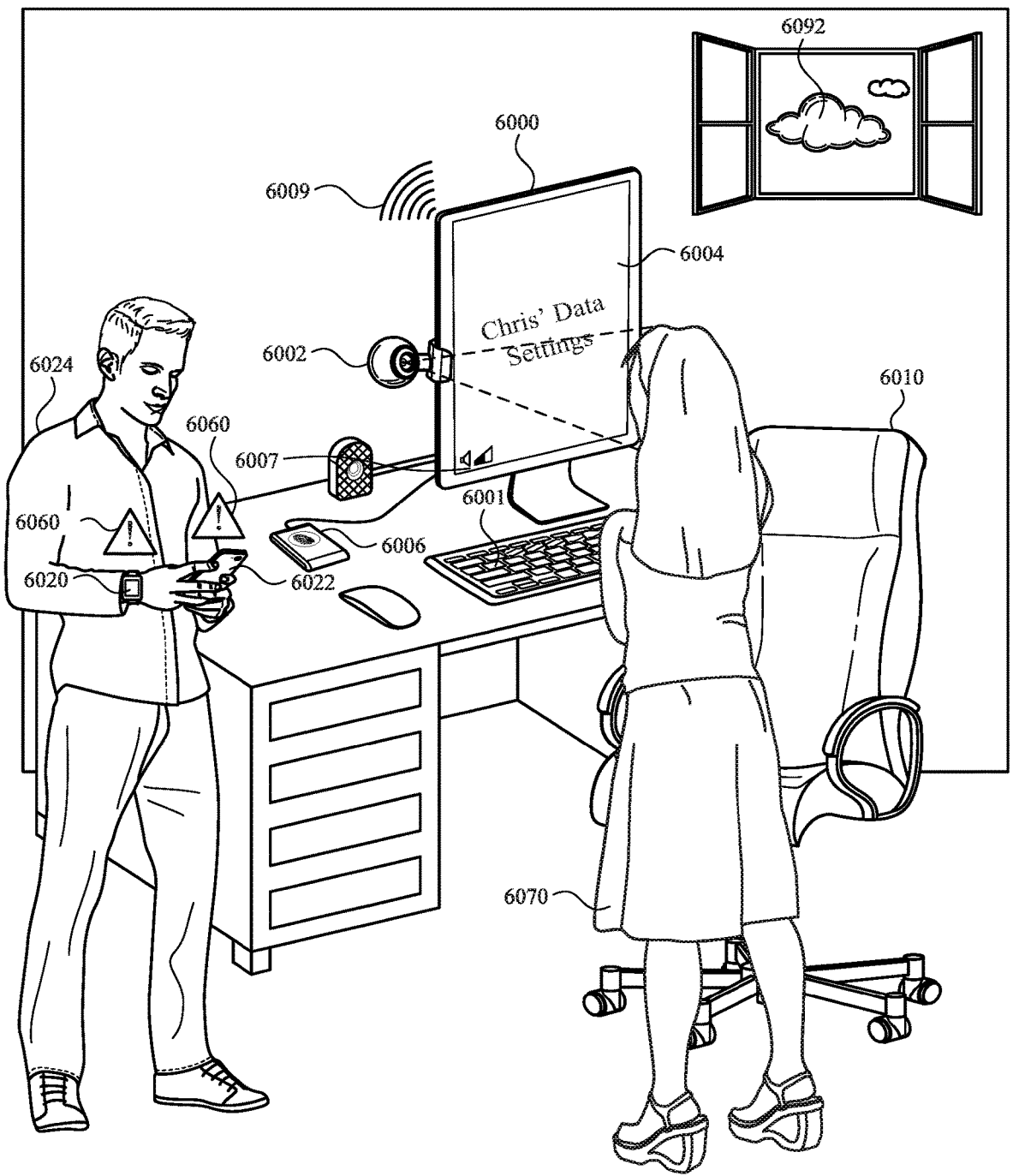
FIG. 6J illustrates a prompt being received on a portable electronic device in accordance with some embodiments.
Figure 6K:
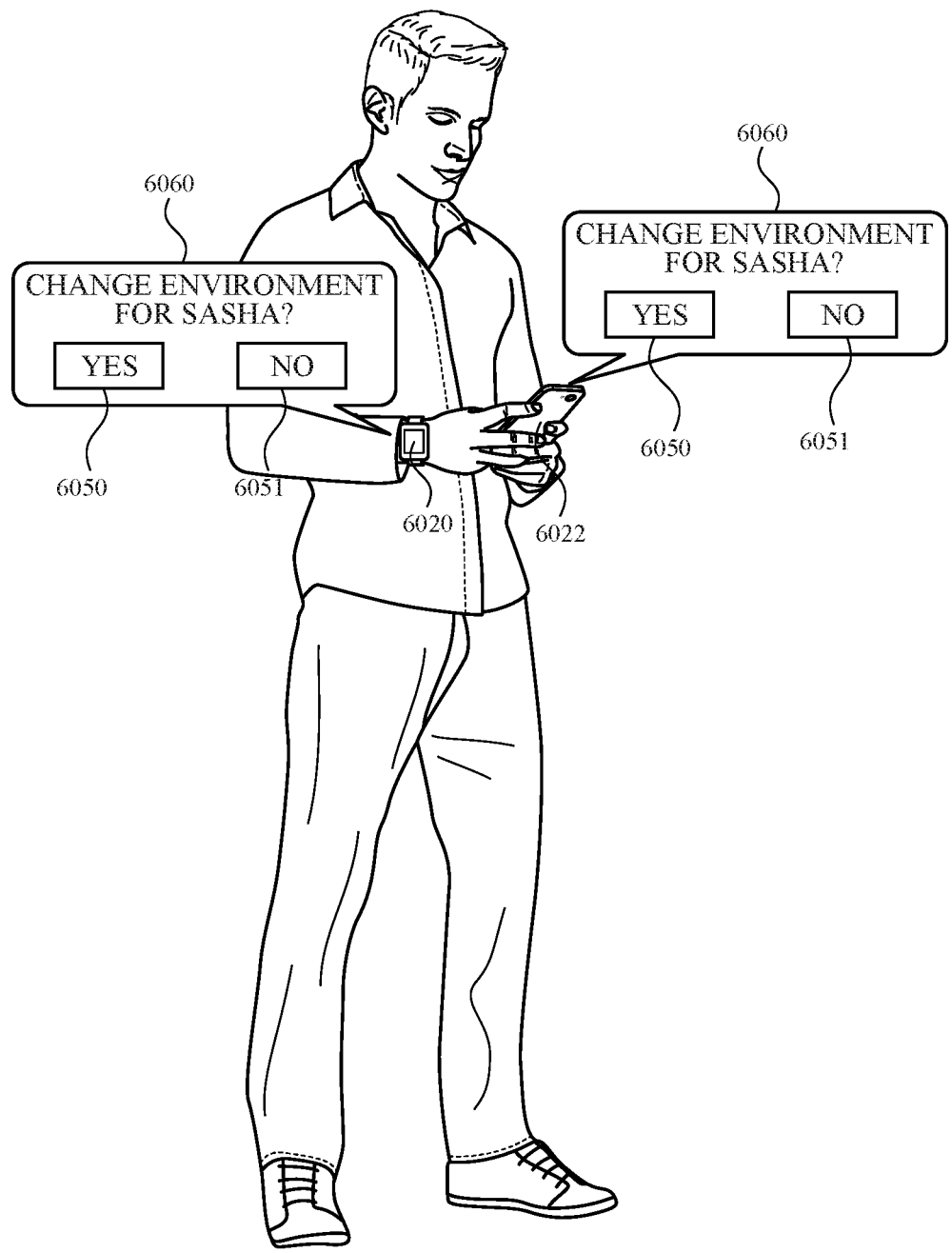
FIG. 6K illustrates a prompt displayed to a first user in accordance with some embodiments.
Figure 6L:
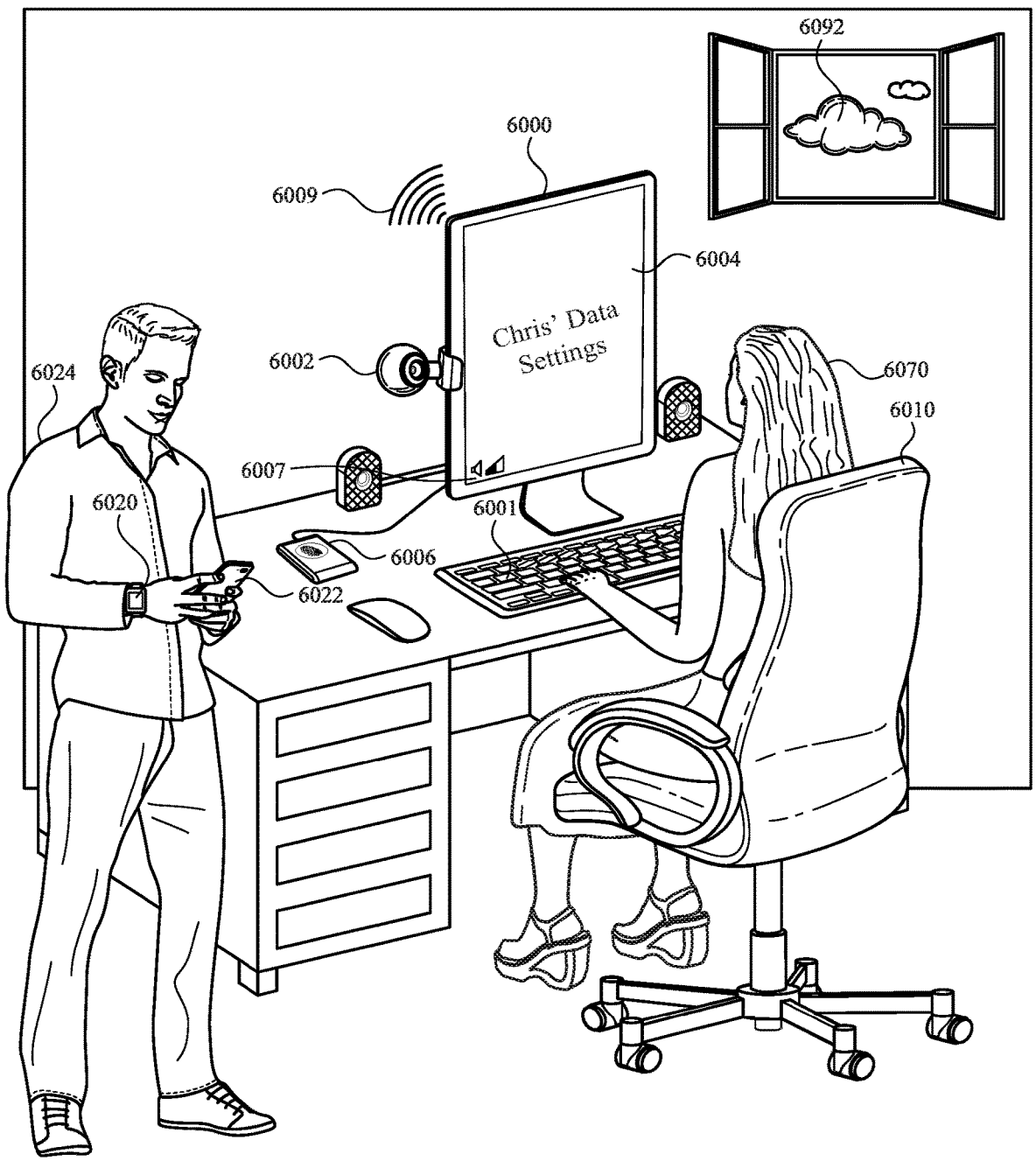
FIGS. 6L-6O illustrate making an ergonomic adjustments for a second user in accordance with some embodiments.
Figure 6M:
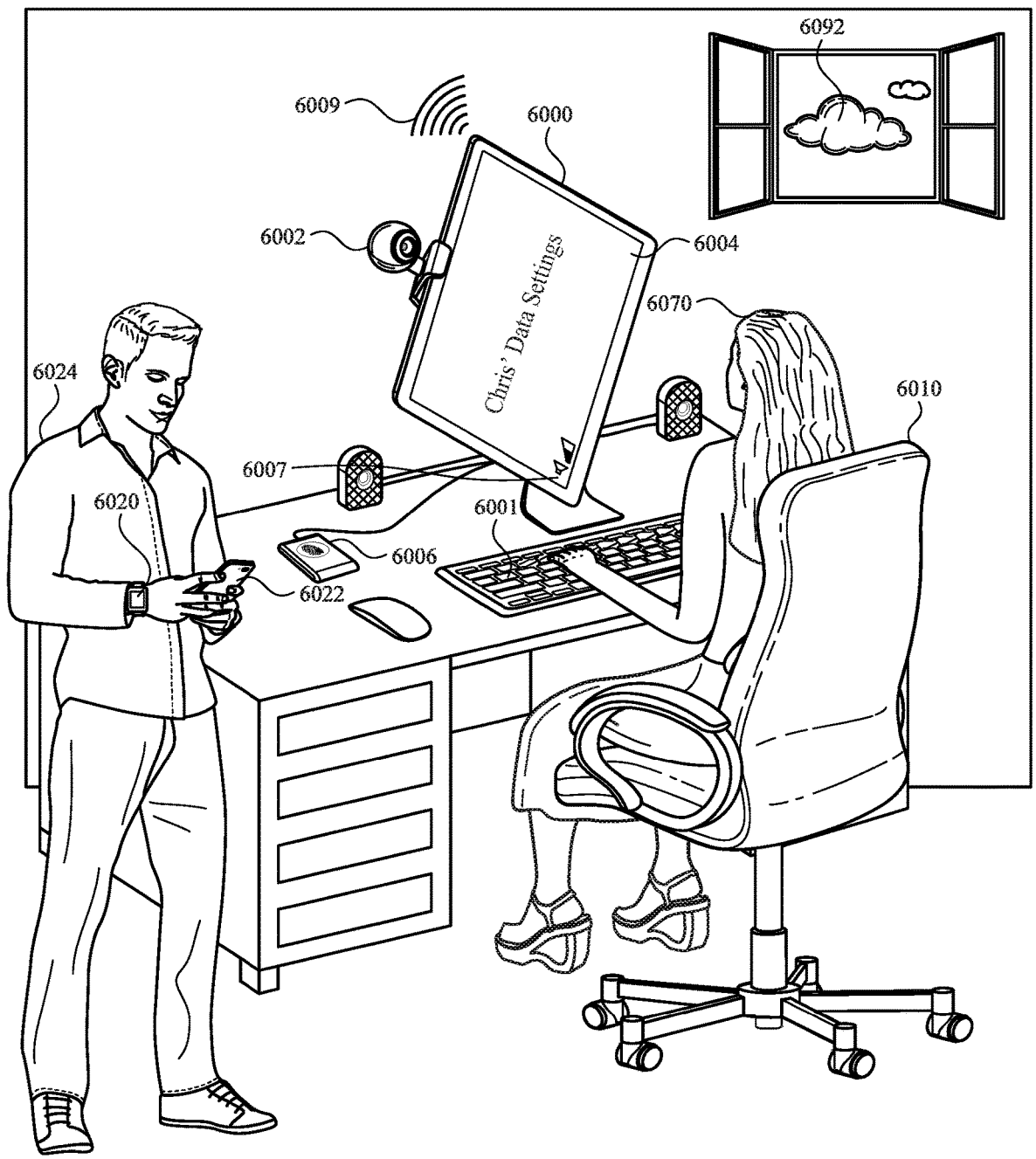
Figure 6N:
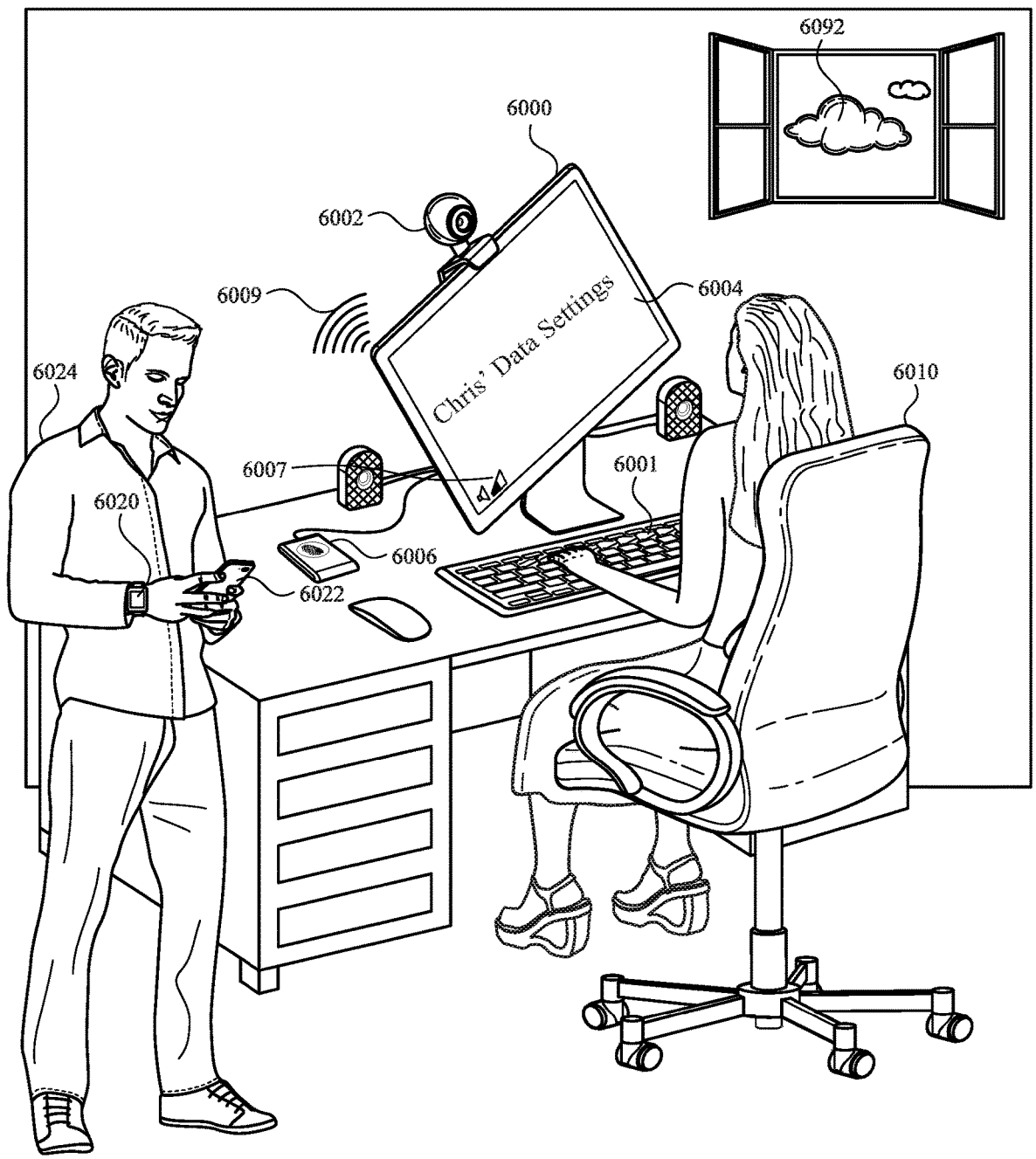
Figure 6O:
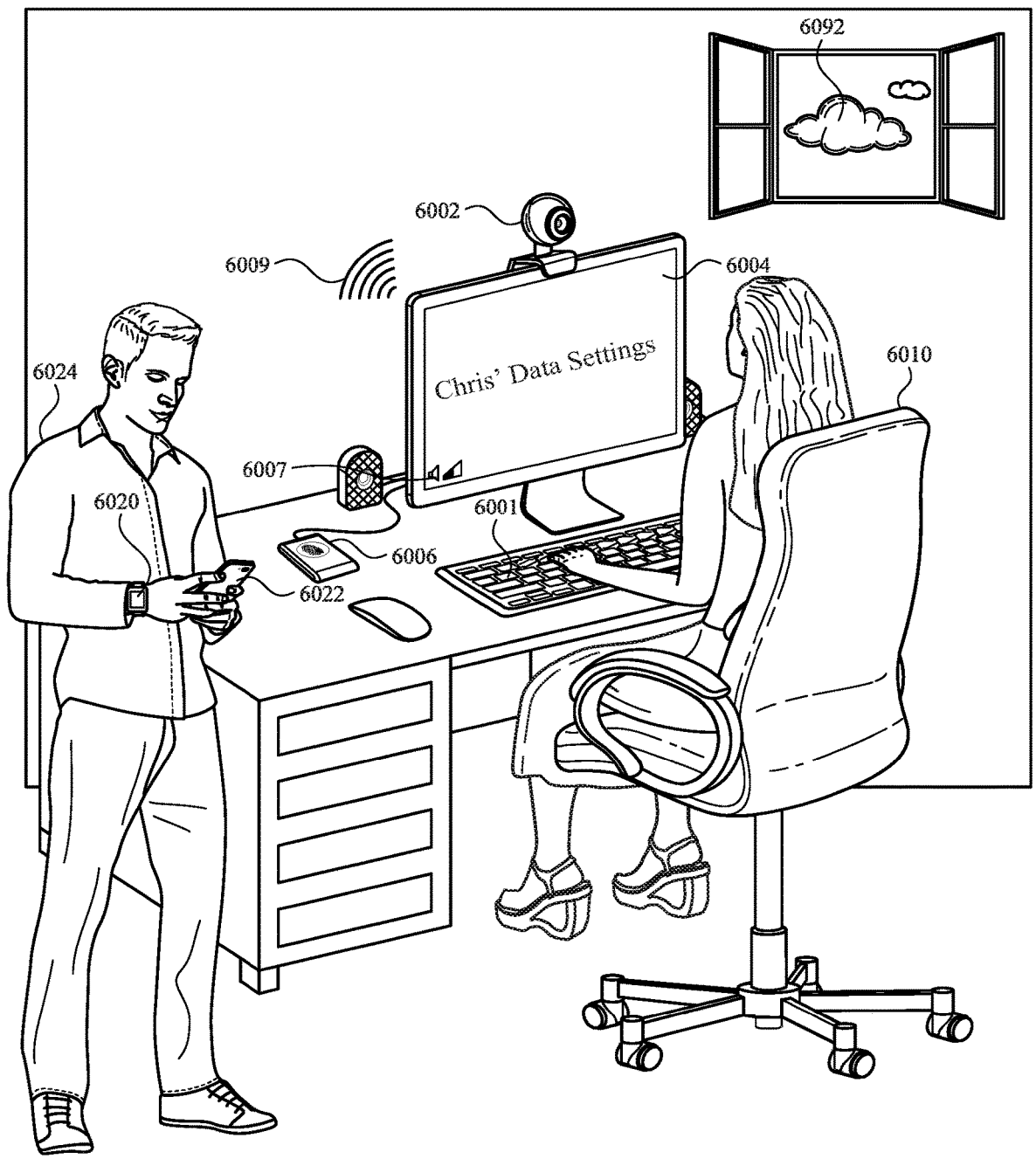
Figure 6P:
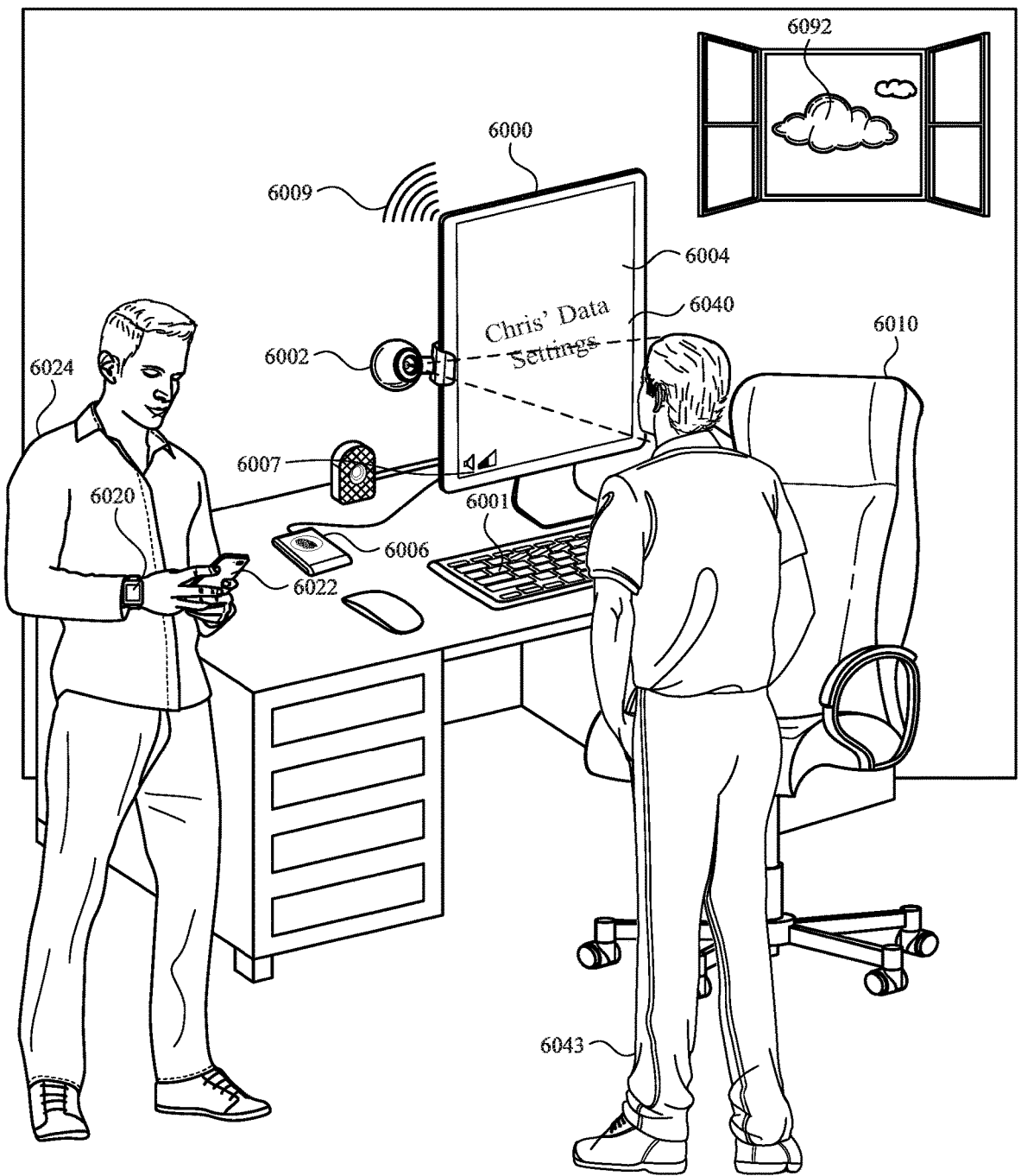
FIG. 6P illustrates a third user entering the office environment in accordance with some embodiments.

FIGS. 6J-6K illustrates that prior to configuring the operating environment using the second operating environment profile, the electronic device 6000 presents a prompt (e.g., 6060) requesting user approval (e.g., permission, confirmation) to configure the operating environment using the second operating environment profile. More specifically, once the electronic device determines that the operating environment (e.g., ergonomic environment) may be changed for Sasha, the electronic device 6000 alerts Chris and prompts him to make a decision on whether to proceed with changing the operating environment for Sasha. In accordance with some embodiments, the alert is visual, audible, and/or haptic. In accordance with some embodiments, the prompt (e.g., 6060) is visually displayed on a mobile device 6020 and/or 6022. In accordance with some embodiments, the electronic device 6000 or the mobile device (e.g., 6020 or 6022) may audibly prompt Chris to make a decision on whether to proceed with the operating environment change.

FIG. 6K further illustrates the prompt 6060 with selectable affordances. A user input or selection of affordance "YES" 6050 (e.g., activation of 6050) will result in the electronic device receiving a user input indicative of approval to configure the operating environment for a second user. More specifically, Chris may select an affordance 6050 to allow the electronic device 6000 to change the operating environment using Sasha's environment profile. In accordance with some embodiments, Chris may not want to change the operating environment, and consequently deny the change in the environment by pressing the "NO" affordance 6051. Selection or activation of 6051 would result in the electronic device forgoing configuring the operating environment using Sasha's operating environment profile and will result in the electronic device maintaining Chris' environment profile.

In accordance with some embodiments, the electronic device forgoes presenting a prompt 6060 requesting user approval (e.g., permission, confirmation) to configure the operating environment using the second operating environment profile. In accordance with some embodiments, the electronic device 6000 proceeds to configure the operating environment (e.g., ergonomic environment) for Sasha, the second user, without permission or confirmation from the first user, Chris.

As illustrated in FIGS. 6L-6O, in accordance with a determination that the second user identifier satisfies an environmental change criteria, the electronic device 6000 configures the operating environment (e.g., ergonomic environment) using a second operating environment profile different from the first operating environment profile. In accordance with some embodiments, the environment change criteria includes a criterion that is satisfied when the second user identifier (e.g., an image of the user 6042 in a field of view 6090 of the camera 6002) correspond to a second data access control profile different from the first data access control profile. More specifically, the electronic device 6000 determines that the user Sasha is different than the currently logged-in user, Chris. In accordance with some embodiments, the electronic device 6000 determines that the second user identifier correspond to a second data access control profile different from the first data access control profile by using facial recognition technology and determining that the image captured of Sasha does not correspond to a stored image of Chris. Consequently, the electronic device 6000 proceeds to configure the operating environment (e.g., ergonomic environment) using Sasha's operating environment profile. As an example, the operating environment is configured by lowering the chair 6010 for Sasha as well as rotating the display, 6004, 90 degrees.

In some examples, the second operating environment profile corresponds to the second user identifier (e.g., an image of the user 6042 in a field of view 6090 of the camera 6002). In some examples, the second operating environment profile does not correspond to the second user identifier (e.g., an image of the user 6042 in a field of view 6090 of the camera 6002). In some examples, the second operating environment profile is not user specific (e.g., the profile is generic) and can apply to a class of users based on the user's identified characteristics. For example, if the electronic device identified a child using their parent's computer, the electronic device 6000 can change the operating environment for the child by configuring the device using a generic child environment profile and adjusting a chair (e.g., 6010) higher even if the child does not have his/her own operating environment profile. In some examples, the second operating environment profile corresponds to the second user identifier.

In accordance with some embodiments, the first operating environment profile includes a first environmental setting (as exemplified in the change of position of the display 6004 in FIGS. 6D-6G) and the second operating environment profile includes a second environmental setting (as exemplified in the change of position of the display 6004 in FIGS. 6D-6G), wherein the first environment setting is distinct from the second environmental setting. In accordance with some embodiments, the first operating environment profile includes at least one or more of the following environmental settings: a screen tilt/rotation settings (as exemplified in the change of position of the display 6004 in FIGS. 6D-6G), display brightness setting (as exemplified by the change of brightness of the display 6004 in FIGS. 6Q and 6R), display color temperature setting, sound volume setting (e.g. 6007 representing the electronic device's volume setting), keyboard modification settings, chair (e.g. 6010) and desk modification settings, and ergonomic modification settings (e.g., based on height, weight, age). In accordance with some embodiments, the electronic device 6000 stores the first environmental setting and/or the second environment setting for quicker retrieval during subsequent usage. In some examples, the first environmental profile and the second environmental profile include two different values for the same environmental setting (e.g., height of chair, brightness of screen). In accordance with some embodiments, an environmental setting is a parameter relating to a discrete environmental setting (e.g., volume, brightness of screen).

In accordance with some embodiments, the first environmental setting and the second environmental setting are defined prior to receiving the second user identifier (e.g., an image of the user 6042 in a field of view 6090 of the camera 6002). In accordance with some embodiments, defining the second operating environmental profile before receiving the second user identifier allows for quicker customization of the operating environment.

In accordance with some embodiments, the electronic device 6000 receives at least one of the first environmental setting and the second environmental setting from a second device (e.g., server, cloud, watch 6020, phone 6022) that is remote (e.g., physical location, GPS location, IP location) from the electronic device 6000. In accordance with some embodiments, the electronic device 6000 sends/transmits the at least one of the first environmental setting and the second environmental setting to the second device for storage. In accordance with some embodiments, the electronic device (e.g., 6000) sends/transmits at least one of the first operating environmental profile and the second operating environmental profile to the second device for storage.

As illustrated in FIGS. 6D-6O, when the electronic device 6000 configures the operating environment (e.g., ergonomic environment) using the second operating environment profile different from the first operating environment profile, the electronic device 6000 maintains at least a third environmental setting (e.g., a setting common to the first and second environment profile such as volume) of the operating environment configured based on the first operating environment profile. In accordance with some embodiments, at least one environmental setting is preserved between the first user and the second user.

As further exemplified in FIGS. 6D-6O, the volume, as represented by 6007, is maintained at a constant level even though the operating environment profile changed from user 6024, Chris, to user 6070, Sasha. In accordance with some embodiments, if the first user, Chris, is hard of hearing and the second user, Sasha, is not, the electronic device 6000 can elect to keep the volume (as exemplified by icon 6007) at an increased level (Chris' setting) so that both users, Chris and Sasha, are able to hear. In accordance with some embodiments, certain operating environmental settings (e.g., volume for a hearing impaired person) may be designated with a higher priority and, as a result, supersede, or take precedence over other similar/related environmental settings (e.g., volume for a normal hearing person) so that they (e.g., the volume) remain constant (e.g., are not changed) when the operating environment profiles are changed. In accordance with some embodiments, the second operating environment profile is used to configure the operating environment to completely overwrite the first operating environment profile so that none of the first operating environment profile settings remain and the operating environment (e.g., ergonomic environment) is configured using the second operating environment profile. In accordance with some embodiments, the operating environment (e.g., ergonomic environment) is configured using one or more environmental setting of the second operating environment profile and the operating environment maintains (e.g., retains) one or more environmental settings of the first operating environment profile.

Figure 6Q:
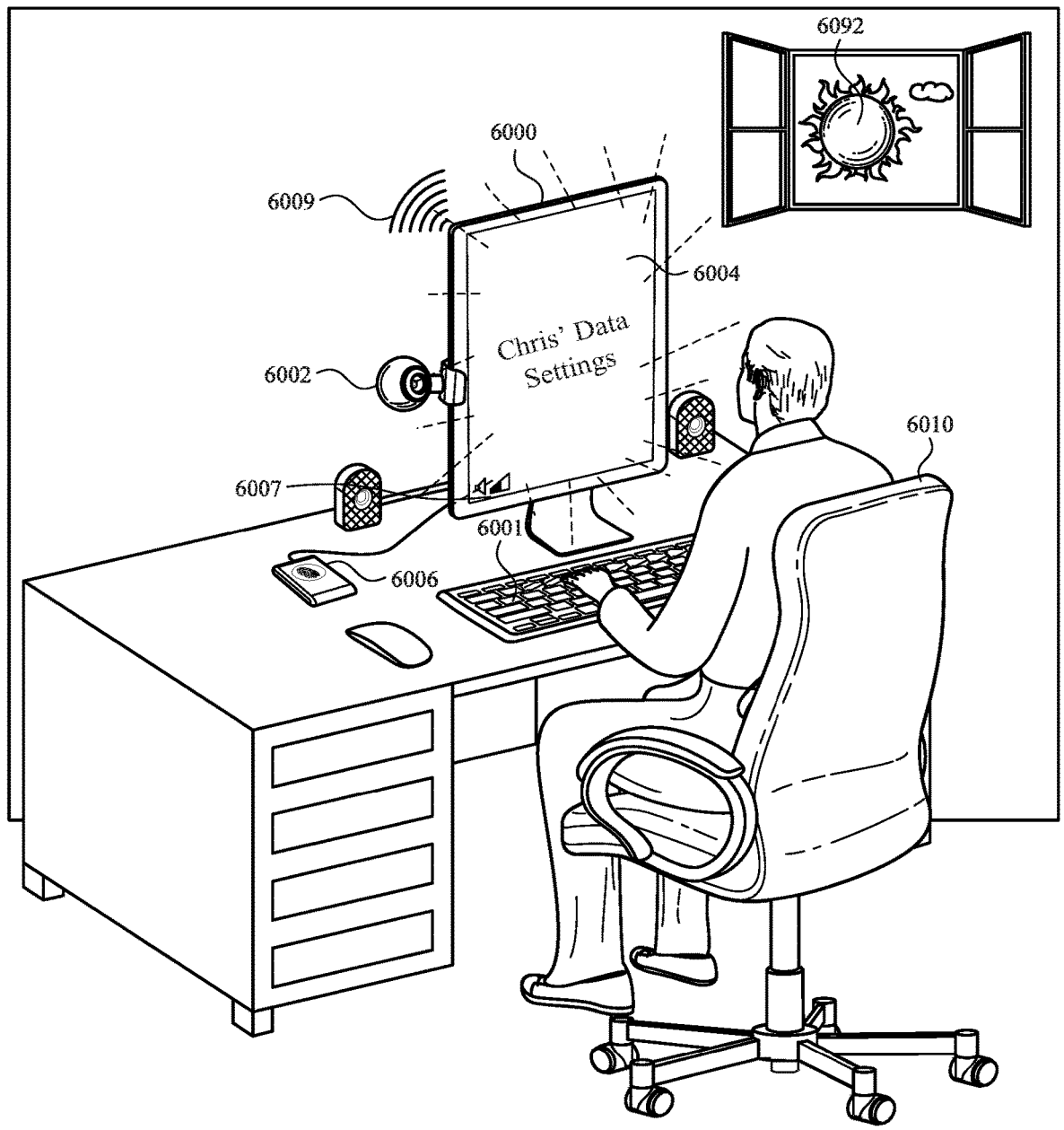
FIGS. 6Q-6R illustrate making ergonomic adjustments based on ambient characteristics in accordance with some embodiments.
Figure 6R:
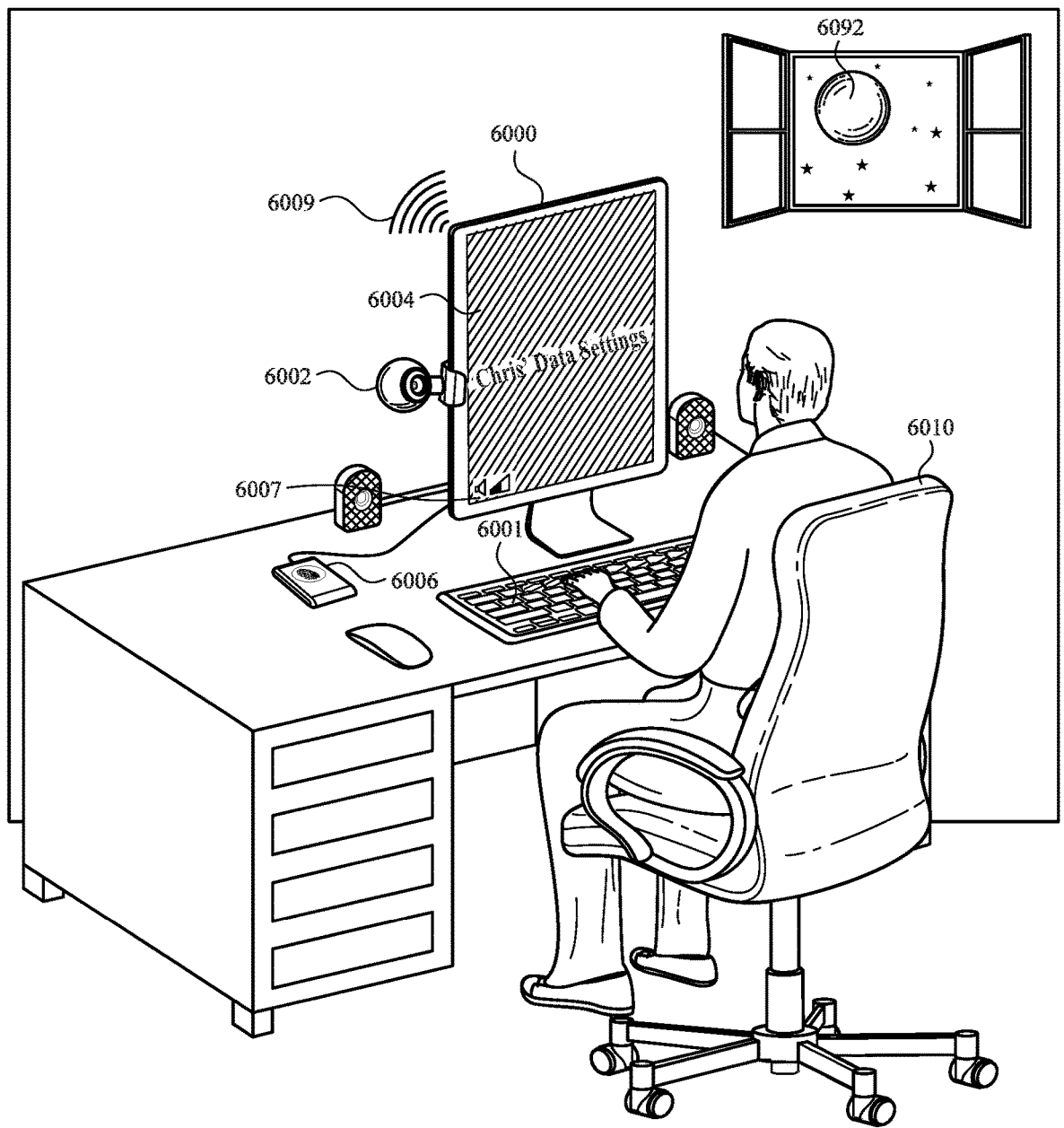
Figure 7A:
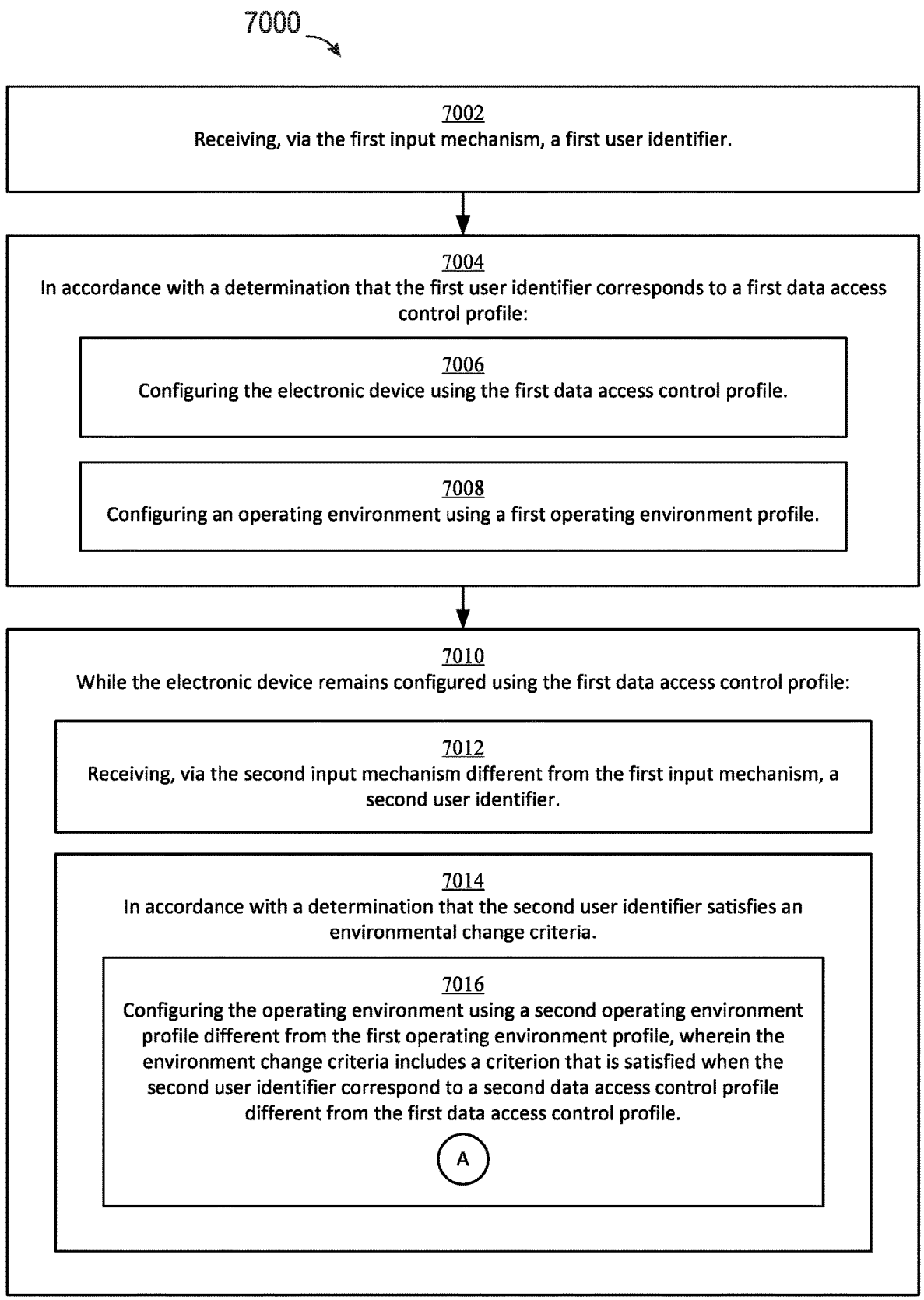

As illustrated in FIGS. 6Q-6R, the operating environment is configured based on the electronic device's 6000 surrounding environment. More specifically, the electronic device 6000 determines one or more characteristics of the environment surrounding the electronic device (e.g., ambient light as exemplified by 6092) and electronic device 6000 configures the operating environment based on the one or more characteristics of the environment surrounding the electronic device 6000. For example, in FIG. 6Q the sun is brightly shining in the room. As a result, display 6004 is made brighter for Chris to compensate for the extra ambient light. On the other hand, as illustrated in FIG. 6R, the moon is visible through the window and there is little ambient light. As a result, the screen is made darker to make for a more pleasant environment for Chris. In accordance with some embodiments, the volume is lowered/raised based on the ambient noise. In accordance with some embodiments, the electronic device 6000 automatically configures the operating environment based on the time of day, the device's location (e.g., car, airplane), or the acceleration/velocity at which the electronic device is moving. In accordance with some embodiments, the electronic device 6000 determines the environmental conditions based on various sensors, weather reports, and user inputted data. In some embodiments, the sensors may be local or remote from the electronic device.

As illustrated in FIG. 6O, when the electronic device 6000 determines that the second user, Sasha, is different from the first user, Chris, the electronic device 6000 still maintains the first data access control profile (e.g., as exemplified by "Chris' Data Settings" remaining displayed on the display 6004 in FIG. 6O). In accordance with some embodiments, when the electronic device 6000 determines that the second user is different form the first user, the electronic device 6000 forgoes configuring the electronic device using the second data access control profile. In accordance with some embodiments, the electronic device does not log-in the second user, but just configure the operating environment for the second user. In accordance with some embodiments, the electronic device 6000 maintains the electronic device's configuration using the first data access control profile between two different users.

In accordance with some embodiments, a first user 6024 may step away from the electronic device 6000 allowing the second user 6070 to temporarily step-in and use the electronic device 6000. In such a scenario the first user's data access control profile would remain, but the operating environment may be altered for the second user (as exemplified in FIGS. 6L-6O where the display 6004 rotates 90 degrees and the chair 6010 is raised upward for user 6070, Sasha). In accordance with some embodiments, if the first user stepped away from the device for a period of time exceeding a predetermined threshold (e.g., 5, 10, 15 minutes), the electronic device optionally locks the electronic device and/or the first data access control profile. Thus, if a second user, Sasha, was authorized to use the electronic device 6000 after the predetermined threshold of time was exceeded, the electronic device would be configured using the second data access control profile and the second operating environment profile. In accordance with some embodiments, after configuring the operating environment (e.g., ergonomic environment) using a second operating environment profile different from the first operating environment profile, the electronic device 6000 changes the device configuration using the second data access control profile (e.g., the ergonomic and the data settings would be configured for Sasha even though Chris was already logged in).

As illustrated in FIG. 6P, if the electronic device 6000 determines that second user identifier (e.g., an image of the user 6043 in a field of view 6090 of the camera 6002) does not satisfy an environmental change criteria, the electronic device 6000 maintains (e.g., doesn't change) the operating environment (e.g., ergonomic environment). In accordance with some embodiments, the second user identifier (e.g., an image of the user 6043 in a field of view 6090 of the camera 6002) does not satisfy an environmental change criterion when the electronic device 6000 does not recognize user 6043.

In accordance with some embodiments, the electronic device (e.g., 6000) identifies the first user and the second user as the same user and thus, maintains the electronic device configuration using the first data access control profile (e.g., forgoes configuring the electronic device using the second data access control profile) and maintains an existing (e.g., configured using a first operating environment profile) operating environment (e.g., forgoing configuring the operating environment using the second operating environment profile).

In accordance with some embodiments, the electronic device 6000 does not configure anything because the first user identifier does not correspond to a first data access control profile. More specifically, in accordance with the electronic device 6000 determining that the first user identifier does not correspond to the first data access control profile (e.g., the first user is not authorized to log in), the electronic device forgoes configuring the electronic device 6000 using the first data access control profile. In some embodiment, the electronic device forgoes setting the personal security settings, data accessibility settings, or browser settings. In accordance with some embodiments, the electronic device 6000 also forgoes configuring the operating environment (e.g., an ergonomic environment of the electronic device) using the first operating environment profile (e.g., the electronic device does not configure an ergonomic environment for a first user based on the predetermined ergonomic profile data).

FIGS. 7A-7B is a flow diagram illustrating a method for FIGS. 6A-6R using an electronic device in accordance with some embodiments. Method 7000 is performed at a device (e.g., 100, 300, 500, 6000) with first input mechanism and a second input mechanism. Some operations in method 7000 are, optionally, combined, the order of some operations are, optionally, changed, and some operations are, optionally, omitted.

As described below, method 7000 provides an intuitive way for changing an ergonomic environment between users. The method reduces the cognitive burden on a user by simplifying and automating the ergonomic environment configuration, thereby creating a more efficient human-machine interface. Additionally, allowing the electronic device to configure the ergonomic environment for multiple users working collaborative at or using one electronic device provides for a more enjoyable and productive environment for users.

At block 7002, the electronic device (e.g., a phone, tablet, desktop computer 6000, vehicle, media playback device and/or a set-top box connected to a television) receives, via the first input mechanism (e.g., a keyboard 6001, RF antenna, fingerprint sensor 6006, personal area network adaptor, local area network adaptor 6009), a first user identifier (e.g., an image, a series of images, username 6030, password 6032, pin code, fingerprint, an identifier of a connectivity request).

At blocks 7004-7008, in accordance with the electronic device determining that the first user identifier (e.g., 6032) corresponds to a first data access control profile (e.g., the user is authorized to log in): the electronic device (e.g., 6000) configures the electronic device (e.g., 6000) using the first data access control profile (e.g., set the personal security settings 6040, data accessibility settings, browser settings) and the electronic device configures an operating environment (e.g., an ergonomic environment of the electronic device 6000) using a first operating environment profile (e.g., configures an ergonomic environment for a first user based on the predetermined ergonomic profile data). In some examples, the first operating environment profile corresponds to the first user identifier. In accordance with some embodiments, as shown in FIG. 6D, Chris' first data access control profile is used to configure the electronic device and the results of the configuration are represented via 6040. In accordance with some embodiments, as exemplified in FIGS. 6D-6G, Chris' operating environment profile is used to configure the operating environment and the result of the configuration is illustrated via the chair 6010 being raised and the display 6004 being rotated 90 degrees.

At blocks 7010-7016, while the electronic device (e.g., 6000) remains configured using the first data access control profile: the electronic device receives, via the second input mechanism (e.g., a camera 6002, a keyboard 6001, RF, fingerprint sensor 6006, personal area network adaptor, local area network adaptor 6009) different from the first input mechanism, a second user identifier (e.g., an image of the user 6042 in a field of view 6090 of the camera 6002, a series of images, password 6032, fingerprint, an identifier of a connectivity request). In some embodiments, in accordance with a the electronic device determining that the second user identifier satisfies an environmental change criteria, the electronic device configures the operating environment (e.g., ergonomic environment) using a second operating environment profile different from the first operating environment profile (as exemplified in FIGS. 6L-6O where a user's 6070 chair 6010 is lowered and the user's 6070 display 6004 is rotated). In some embodiments, the environment change criteria includes a criterion that is satisfied when the second user identifier correspond to a second data access control profile different from the first data access control profile. In some examples, the chair (e.g., 6010) is automatically adjusted higher for a child using their parent's computer when the electronic device determines that a child is using the electronic device. In some examples, the second operating environment profile corresponds to the second user identifier.

In accordance with some embodiments, the operating environment may change while the first user is logged in, but the system will remain configured using the first data access control profile. In accordance with some embodiments, the electronic device (e.g., 6000) determines whether the second user identifier corresponds to a second data access control profile different from the first data access control profile. In accordance with some embodiments, a remote server determines whether the second user identifier corresponds to the second data access control profile. In accordance with some embodiments, a data access control profile includes log-in security settings, network security settings, theme settings, web-browser cookie data/settings, web-browser homepage settings, web-browser bookmark settings, media content access settings, password data, data identifying language and character set, and a list of plug-ins.

In accordance with some embodiments, the first input mechanism (e.g., 6001) and the second input mechanism (e.g., 6002) are independently selected from the group consisting of at least one of a keyboard (e.g., 6001), radio receiver, a fingerprint sensor (e.g., 6006), camera (e.g., 6002), a personal area network adaptor, and a local area network adaptor (e.g., 6009).

At block 7018 in FIG. 7B, in accordance with some embodiments, the first data access control profile includes a data setting corresponding to a grant of access (e.g., read, write, delete) to a resource (e.g., a file, disk drive, memory, network port). In some embodiments, the second data access control profile does not include a data setting corresponding to a grant of access to the resource. In some embodiments, the data setting is at least one of log-in security settings, network security settings, theme settings, web-browser cookie data and settings, web-browser homepage settings, web-browser bookmark settings, media content access settings, password data, data identifying language and character set, and a list of available plug-ins.

At block 7020 in FIG. 7B, in accordance with some embodiments, the first operating environment profile includes a first environmental setting and the second operating environment profile includes a second environmental setting. In some embodiments, the first environment setting is distinct from the second environmental setting. In some embodiments, the first operating environment profile includes at least one or more of the following environmental settings: a screen tilt/rotation settings (as exemplified in the change of position of the display 6004 in FIGS. 6D-6G), display brightness setting (as exemplified by the change of brightness of the display 6004 in FIGS. 6Q and 6R), display color temperature setting, sound volume setting (as exemplified by affordance 6007), keyboard modification settings, chair (e.g. 6010) and desk modification settings, and ergonomic modification settings (e.g., based on height, weight, age). In some embodiments, the electronic device 6000 stores the first environmental setting and/or the second environment setting for quicker retrieval during subsequent usage. In some examples, the first environmental profile and the second environmental profile include two different values for the same environmental setting (e.g., height of chair, brightness of screen). In some embodiments, an environmental setting is a parameter relating to a discrete environmental setting (e.g., volume, brightness of screen).

At block 7022 in FIG. 7B, in accordance with some embodiments, the first environmental setting and the second environmental setting are defined prior to receiving the second user identifier. In some embodiments, defining the second operating environmental profile before receiving the second user identifier allows for quicker customization of the operating environment.

At block 7024 in FIG. 7B, in accordance with some embodiments, the electronic device (e.g., 6000) receives at least one of the first environmental setting and the second environmental setting from a second device (e.g., server, cloud, watch 6020, phone 6022) that is remote (e.g., physical location, GPS location, IP location) from the electronic device (e.g., 6000). In some embodiments, the electronic device (e.g., 6000) sends/transmits the at least one of the first environmental setting and the second environmental setting to the second device for storage. In some embodiments, the electronic device (e.g., 6000) sends/transmits at least one of the first operating environmental profile and the second operating environmental profile to the second device for storage.

At block 7026 in FIG. 7B, in accordance with some embodiments, the electronic device (e.g., 6000) configuring the operating environment (e.g., ergonomic environment) using the second operating environment profile different from the first operating environment profile includes maintaining at least a third environmental setting (e.g., a setting common/distinct to the first and second environment profile) of the operating environment configured based on the first operating environment profile. In some examples, as illustrated in FIGS. 6H-6O, the volume, as represented by 6007, is maintained at the constant level even though the operating environment profile changed from user 6024 to user 6070. Thus, if the first user is hard of hearing and the second user is not, the electronic device can elect to keep the volume (as exemplified by icon 6007) at an increased level so that both users are able to hear.

In some embodiments, certain operating environmental settings (e.g., volume for a hearing impaired person) may be designated with a higher priority and, as a result, supersede, or take precedence over other similar/related environmental settings (e.g., volume for a normal hearing person) so that they (e.g., the volume 6007) remain constant (e.g., are not changed) when the operating environment profiles are changed. In accordance with some embodiments, the second operating environment profile is used to configure the operating environment to completely overwrite the first operating environment profile so that none of the first operating environment profile settings remain and the operating environment is configured using the second operating environment profile. In accordance with some embodiments, the operating environment is configured using one or more environmental setting of the second operating environment profile and the operating environment maintains one or more environmental settings of the first operating environment profile.

In accordance with some embodiments, subsequent to configuring the operating environment using the first or second operating environment profile, the electronic device determines one or more characteristics of the environment surrounding the electronic device (e.g., ambient light (as exemplified by 6092), ambient noise, time of day). In some embodiments, the electronic device configures the operating environment (e.g., screen is made brighter/darker, volume is lowered/raised) based on the one or more characteristics of the environment surrounding the electronic device (e.g., 6000).

In accordance with some embodiments, prior to configuring the operating environment using the second operating environment profile, the electronic device presents a prompt (e.g., 6060) requesting user approval (e.g., permission, confirmation) to configure the operating environment using the second operating environment profile. In some embodiments, the electronic device receives user input indicative of approval (e.g., activation of 6050) in response to the prompt requesting user approval to configure the operating environment. In some embodiments, the configuring the operating environment using the second operating environment profile is in accordance with a determination that the user input in response to the prompt is indicative of approval to configure the operating environment. For example, the operating environment is configured when (e.g., only when) the user input indicates approval. In some embodiments, the environmental change criteria further includes criterion that is satisfied when user input indicative of approval (e.g., activation of 6050) is received prior to configuring the operating environment using the second operating environment profile that the user input in response to the prompt is not indicative of approval to configure the operating environment: the electronic device maintains an existing (e.g., configured using a first operating environment profile) operating environment. For example, the electronic device forgoes configuring the operating environment using the second operating environment profile. In some embodiments, the prompt is on the electronic device (e.g., the computer) or a second electronic device (e.g., a watch or phone).

In accordance with some embodiments, prior to configuring the operating environment using the second operating environment profile, the electronic device forgoes presenting a prompt requesting user approval (e.g., permission, confirmation) to configure the operating environment using the second operating environment profile. For example, the electronic device configures the operating environment using the second operating environment profile without further user input.

In accordance with some embodiments, after the electronic device configures the operating environment (e.g., ergonomic environment) using a second operating environment profile different from the first operating environment profile, the electronic device maintains the electronic device configured using the first data access control profile. For example, the electronic device forgoes configuring the electronic device using the second data access control profile. In some embodiments, the electronic device does not log in the second user, but configures the operating environment. In some embodiments, the electronic device configuration is maintained by using the first data access control profile. In some embodiments, a first user 6024 may step away from the device allowing the second user 6070 to temporarily step-in and use the electronic device. In such a scenario the first user's data access control profile would remain, but the operating environment may be altered for the second user (as exemplified in FIGS. 6L-6O where the display 6004 rotates 90 degrees and the chair 6010 is raised upward for user 6070). In some embodiments, if the first user stepped away from the electronic device for a period of time exceeding a predetermined threshold (e.g., 5, 10, 15 minutes), the electronic device optionally locks the electronic device and/or the first data access control profile. Thus, if a second user starts to use the electronic device (e.g., 6000) after the predetermined threshold of time was exceeded; the electronic device would be configured using the second data access control profile and the second operating environment profile. In some embodiments, after configuring the operating environment (e.g., ergonomic environment) using a second operating environment profile different from the first operating environment profile, the electronic device changes the device configuration using the second data access control profile.

In accordance with some embodiments, in accordance with the electronic device determining that the second user identifier does not satisfy an environmental change criteria (e.g., the electronic device 6000 does not recognize user 6043), the electronic device maintains (e.g., does not change) the operating environment (e.g., ergonomic environment). In some embodiments, the electronic device (e.g., 6000) identifies the first user and the second user as the same user and thus, maintains the electronic device configuration using the first data access control profile (e.g., forgoing configuring the electronic device using the second data access control profile) and maintains an existing (e.g., configured using a first operating environment profile) operating environment (e.g., forgoes configuring the operating environment using the second operating environment profile).

In accordance with some embodiments, in accordance with the electronic device determining that the first user identifier does not correspond to the first data access control profile (e.g., the first user is not authorized to log in), the electronic device forgoes configuring the electronic device using the first data access control profile (e.g., do not set the personal security settings, data accessibility settings, browser settings, don't log in the first user.). In some embodiments, the electronic device also forgoes configuring the operating environment (e.g., an ergonomic environment of the electronic device) using the first operating environment profile. Thus, the electronic device does not configure an ergonomic environment for a first user based on the predetermined ergonomic profile data.

Figure 8:
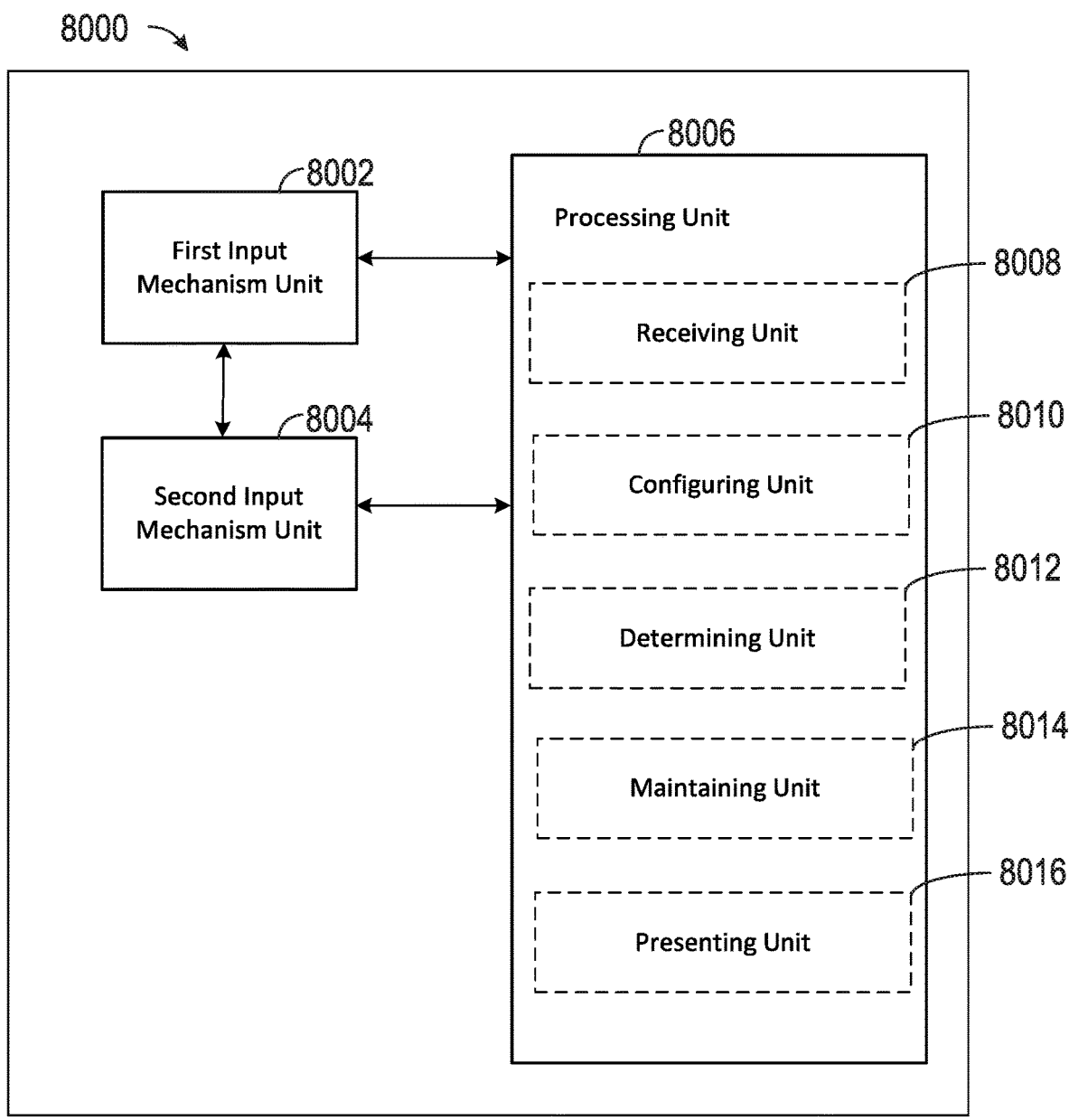
FIG. 8 is a functional block diagram, in accordance with some embodiments.

In accordance with some embodiments, FIG. 8 shows an exemplary functional block diagram of an electronic device 8000 configured in accordance with the principles of the various described embodiments. In accordance with some embodiments, the functional blocks of electronic device 8000 are configured to perform the techniques described above. The functional blocks of the electronic device 8000 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 8000 includes a first input mechanism unit 8002 configured to receive user input and a second input mechanism unit 8004 configured to receive user input, and a processing unit 8006 coupled to first input mechanism unit 8002 and, optionally, the second input mechanism unit 8004. In accordance with some embodiments, the processing unit 8006 includes a receiving unit 8008, a configuring unit 8010, a determining unit 8012, and optionally, a maintaining unit 8014, and a presenting unit 8016.

The processing unit 8006 is configured to: receive (e.g., with receiving unit 8008), via the first input mechanism unit 8002, a first user identifier; in accordance with a determination that the first user identifier corresponds to a first data access control profile: configure (e.g., with configuring unit 8010) the electronic device using the first data access control profile; and configure (e.g., with configuring unit 8010) an operating environment using a first operating environment profile; while the electronic device remains configured (e.g., with configuring unit 8010) using the first data access control profile: receive (e.g., with receiving unit 8008), via the second input mechanism unit 8004 different from the first input mechanism unit 8002, a second user identifier; in accordance with a determination that the second user identifier satisfies an environmental change criteria, configure (e.g., with configuring unit 8010) the operating environment using a second operating environment profile different from the first operating environment profile, wherein the environment change criteria includes a criterion that is satisfied when the second user identifier correspond to a second data access control profile different from the first data access control profile.

In some embodiments, the first input mechanism unit 8002 and the second input mechanism unit 8004 are independently selected from the group consisting of at least one of a keyboard, radio receiver, a fingerprint sensor, camera, a personal area network adaptor, and a local area network adaptor.

In some embodiments, the first data access control profile includes a data setting corresponding to a grant of access to a resource; and the second data access control profile does not include a data setting corresponding to a grant of access to the resource.

In some embodiments, the first operating environment profile includes a first environmental setting and the second operating environment profile includes a second environmental setting, wherein the first environment setting is distinct from the second environmental setting.

In some embodiments, the first environmental setting and the second environmental setting are defined prior to receiving the second user identifier.

In some embodiments, the processing unit 8006 further configured to: receive (e.g., with receiving unit 8008) at least one of the first environmental setting and the second environmental setting from a second device that is remote from the electronic device.

In some embodiments, configuring the operating environment using the second operating environment profile different from the first operating environment profile includes maintaining (e.g., with maintaining unit 8014) at least a third environmental setting of the operating environment configured (e.g., with configuring unit 8010) based on the first operating environment profile.

In some embodiments, the processing unit 8006 is further configured to: subsequent to configuring (e.g., with configuring unit 8010) the operating environment using the first or second operating environment profile: determine (e.g., with determining unit 8012) one or more characteristics of the environment surrounding the electronic device; and configure (e.g., with configuring unit 8010) the operating environment based on the one or more characteristics of the environment surrounding the electronic device In some embodiments, the processing unit 8006 is further configured to: prior to configuring (e.g., with configuring unit 8010) the operating environment using the second operating environment profile: present (e.g., with presenting unit 8016) a prompt requesting user approval to configure (e.g., with configuring unit 8010) the operating environment using the second operating environment profile; and receive (e.g., with receiving unit 8008) user input indicative of approval in response to the prompt requesting user approval to configure (e.g., with configuring unit 8010) the operating environment; wherein configuring (e.g., with configuring unit 8010) the operating environment using the second operating environment profile is in accordance with a determination that the user input in response to the prompt is indicative of approval to configure (e.g., with configuring unit 8010) the operating environment; and wherein the environmental change criteria further includes criterion that is satisfied when user input indicative of approval is received (e.g., with receiving unit 8008) prior to configuring the operating environment using the second operating environment profile that the user input in response to the prompt is not indicative of approval to configure (e.g., with configuring unit 8010) the operating environment: maintain (e.g., with maintaining unit 8014) an existing operating environment.

In some embodiments, the processing unit 8006 is further configured to: prior to configuring (e.g., with configuring unit 8010) the operating environment using the second operating environment profile: forgo presenting (e.g., with presenting unit 8016) a prompt requesting user approval to configure (e.g., with configuring unit 8010) the operating environment using the second operating environment profile.

In some embodiments, the processing unit 8006 is further configured to: after configuring (e.g., with configuring unit 8010) the operating environment using a second operating environment profile different from the first operating environment profile, maintain (e.g., with maintaining unit 8014) the electronic device configured (e.g., with configuring unit 8010) using the first data access control profile.

In some embodiments, the processing unit 8006 is further configured to: in accordance with a determination that the second user identifier does not satisfy an environmental change criteria, maintain (e.g., with maintaining unit 8014) the operating environment.

In some embodiments, the processing unit 8006 is further configured to: in accordance with a determination that the first user identifier does not correspond to the first data access control profile: forgo configuring (e.g., with configuring unit 8010) the electronic device using the first data access control profile; and forgo configuring (e.g., with configuring unit 8010) the operating environment using the first operating environment profile.

The operations described above with reference to FIGS. 7A-7B are, optionally, implemented by components depicted in FIGS. 1A-1B or FIG. 8. For example, configuring operation 7006, receiving operation 7012, and maintaining operation 7026 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In accordance with some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A non-transitory computer-readable storage medium storing one or more programs configured to be executed by one or more processors of an electronic device with a first input mechanism and a second input mechanism, the one or more programs including instructions for:
    receiving, via the first input mechanism, a first user identifier;
    in accordance with a determination that the first user identifier corresponds to a first data access control profile:
        configuring the electronic device using the first data access control profile; and
        configuring an operating environment using a first operating environment profile; and
    while the electronic device remains configured using the first data access control profile:
        receiving, via the second input mechanism different from the first input mechanism, a second user identifier; and
        in accordance with a determination that the second user identifier satisfies an environmental change criteria:
            configuring the operating environment using a second operating environment profile different from the first operating environment profile, wherein the environment change criteria includes a criterion that is satisfied when the second user identifier correspond to a second data access control profile different from the first data access control profile; and forgo configuring the electronic device using the second data access control profile.

2. The non-transitory computer-readable storage medium of claim 1, wherein the first input mechanism and the second input mechanism are independently selected from the group consisting of at least one of a keyboard, radio receiver, a fingerprint sensor, camera, a personal area network adaptor, and a local area network adaptor.

3. The non-transitory computer-readable storage medium of claim 1, wherein:
the first data access control profile includes a data setting corresponding to a grant of access to a resource; and
the second data access control profile does not include a data setting corresponding to a grant of access to the resource.

4. The non-transitory computer-readable storage medium of claim 1, wherein the first operating environment profile includes a first environmental setting and the second operating environment profile includes a second environmental setting, wherein the first environment setting is distinct from the second environmental setting.

5. The non-transitory computer-readable storage medium of claim 4, wherein the first environmental setting and the second environmental setting are defined prior to receiving the second user identifier.

6. The non-transitory computer-readable storage medium of claim 4, further comprising instructions for:
receiving at least one of the first environmental setting and the second environmental setting from a second device that is remote from the electronic device.

7. The non-transitory computer-readable storage medium of claim 1, wherein configuring the operating environment using the second operating environment profile different from the first operating environment profile includes maintaining at least a third environmental setting of the operating environment configured based on the first operating environment profile.

8. The non-transitory computer-readable storage medium of claim 1, further comprising instructions for:
subsequent to configuring the operating environment using the first or second operating environment profile:
determining one or more characteristics of the environment surrounding the electronic device; and
configuring the operating environment based on the one or more characteristics of the environment surrounding the electronic device.

9. The non-transitory computer-readable storage medium of claim 1, further comprising instructions for:
prior to configuring the operating environment using the second operating environment profile:
presenting a prompt requesting user approval to configure the operating environment using the second operating environment profile; and
receiving user input indicative of approval in response to the prompt requesting user approval to configure the operating environment;
wherein configuring the operating environment using the second operating environment profile is in accordance with a determination that the user input in response to the prompt is indicative of approval to configure the operating environment; and
wherein the environmental change criteria further includes criterion that is satisfied when user input indicative of approval is received prior to configuring the operating environment using the second operating environment profile that the user input in response to the prompt is not indicative of approval to configure the operating environment:
maintaining an existing operating environment.

10. The non-transitory computer-readable storage medium of claim 1, further comprising instructions for:
prior to configuring the operating environment using the second operating environment profile:
forgoing presenting a prompt requesting user approval to configure the operating environment using the second operating environment profile.

11. The non-transitory computer-readable storage medium of claim 1, further comprising instructions for:
after configuring the operating environment using a second operating environment profile different from the first operating environment profile, maintaining the electronic device configured using the first data access control profile.

12. The non-transitory computer-readable storage medium of claim 1, further comprising instructions for:
in accordance with a determination that the second user identifier does not satisfy an environmental change criteria, maintaining the operating environment.

13. The non-transitory computer-readable storage medium of claim 1, further comprising instructions for:
in accordance with a determination that the first user identifier does not correspond to the first data access control profile:
forgoing configuring the electronic device using the first data access control profile; and
forgoing configuring the operating environment using the first operating environment profile.

14. An electronic device, comprising:
a first input mechanism and a second input mechanism;
one or more processors; and
memory storing one or more programs configured to be executed by the one or more processors, the one or more programs including instructions for:
receiving, via the first input mechanism, a first user identifier;
in accordance with a determination that the first user identifier corresponds to a first data access control profile:
configuring the electronic device using the first data access control profile; and
configuring an operating environment using a first operating environment profile; and
while the electronic device remains configured using the first data access control profile:
receiving, via the second input mechanism different from the first input mechanism, a second user identifier; and
in accordance with a determination that the second user identifier satisfies an environmental change criteria:
configuring the operating environment using a second operating environment profile different from the first operating environment profile, wherein the environment change criteria includes a criterion that is satisfied when the second user identifier correspond to a second data access control profile different from the first data access control profile; and
forgo configuring the electronic device using the second data access control profile.

15. A method, comprising:
at an electronic device with a first input mechanism and a second input mechanism:
receiving, via the first input mechanism, a first user identifier;
in accordance with a determination that the first user identifier corresponds to a first data access control profile:
configuring the electronic device using the first data access control profile; and
configuring an operating environment using a first operating environment profile; and
while the electronic device remains configured using the first data access control profile:
receiving, via the second input mechanism different from the first input mechanism, a second user identifier; and
in accordance with a determination that the second user identifier satisfies an environmental change criteria:
configuring the operating environment using a second operating environment profile different from the first operating environment profile, wherein the environment change criteria includes a criterion that is satisfied when the second user identifier correspond to a second data access control profile different from the first data access control profile; and
forgo configuring the electronic device using the second data access control profile.

16. The electronic device of claim 14, wherein the first input mechanism and the second input mechanism are independently selected from the group consisting of at least one of a keyboard, radio receiver, a fingerprint sensor, camera, a personal area network adaptor, and a local area network adaptor.

17. The electronic device of claim 14, wherein:
the first data access control profile includes a data setting corresponding to a grant of access to a resource; and
the second data access control profile does not include a data setting corresponding to a grant of access to the resource.

18. The electronic device of claim 14, wherein the first operating environment profile includes a first environmental setting and the second operating environment profile includes a second environmental setting, wherein the first environment setting is distinct from the second environmental setting.

19. The electronic device of claim 18, wherein the first environmental setting and the second environmental setting are defined prior to receiving the second user identifier.

20. The electronic device of claim 18, further comprising instructions for:
receiving at least one of the first environmental setting and the second environmental setting from a second device that is remote from the electronic device.

21. The electronic device of claim 14, wherein configuring the operating environment using the second operating environment profile different from the first operating environment profile includes maintaining at least a third environmental setting of the operating environment configured based on the first operating environment profile.

22. The electronic device of claim 14, further comprising instructions for:
subsequent to configuring the operating environment using the first or second operating environment profile:
determining one or more characteristics of the environment surrounding the electronic device; and
configuring the operating environment based on the one or more characteristics of the environment surrounding the electronic device.

23. The electronic device of claim 14, further comprising instructions for:
prior to configuring the operating environment using the second operating environment profile:
presenting a prompt requesting user approval to configure the operating environment using the second operating environment profile; and
receiving user input indicative of approval in response to the prompt requesting user approval to configure the operating environment;
wherein configuring the operating environment using the second operating environment profile is in accordance with a determination that the user input in response to the prompt is indicative of approval to configure the operating environment; and
wherein the environmental change criteria further includes criterion that is satisfied when user input indicative of approval is received prior to configuring the operating environment using the second operating environment profile that the user input in response to the prompt is not indicative of approval to configure the operating environment:
maintaining an existing operating environment.

24. The electronic device of claim 14, further comprising instructions for:
prior to configuring the operating environment using the second operating environment profile:
forgoing presenting a prompt requesting user approval to configure the operating environment using the second operating environment profile.

25. The electronic device of claim 14, further comprising instructions for:
after configuring the operating environment using a second operating environment profile different from the first operating environment profile, maintaining the electronic device configured using the first data access control profile.

26. The electronic device of claim 14, further comprising instructions for:
in accordance with a determination that the second user identifier does not satisfy an environmental change criteria, maintaining the operating environment.

27. The electronic device of claim 14, further comprising instructions for:
in accordance with a determination that the first user identifier does not correspond to the first data access control profile:
forgoing configuring the electronic device using the first data access control profile; and
forgoing configuring the operating environment using the first operating environment profile.

28. The method of claim 15, wherein the first input mechanism and the second input mechanism are independently selected from the group consisting of at least one of a keyboard, radio receiver, a fingerprint sensor, camera, a personal area network adaptor, and a local area network adaptor.

29. The method of claim 15, wherein:
the first data access control profile includes a data setting corresponding to a grant of access to a resource; and the second data access control profile does not include a data setting corresponding to a grant of access to the resource.

30. The method of claim 15, wherein the first operating environment profile includes a first environmental setting and the second operating environment profile includes a second environmental setting, wherein the first environment setting is distinct from the second environmental setting.

31. The method of claim 30, wherein the first environmental setting and the second environmental setting are defined prior to receiving the second user identifier.

32. The method of claim 30, further comprising:
receiving at least one of the first environmental setting and the second environmental setting from a second device that is remote from the electronic device.

33. The method of claim 15, wherein configuring the operating environment using the second operating environment profile different from the first operating environment profile includes maintaining at least a third environmental setting of the operating environment configured based on the first operating environment profile.

34. The method of claim 15, further comprising:
subsequent to configuring the operating environment using the first or second operating environment profile:
determining one or more characteristics of the environment surrounding the electronic device; and
configuring the operating environment based on the one or more characteristics of the environment surrounding the electronic device.

35. The method of claim 15, further comprising:
prior to configuring the operating environment using the second operating environment profile:
presenting a prompt requesting user approval to configure the operating environment using the second operating environment profile; and
receiving user input indicative of approval in response to the prompt requesting user approval to configure the operating environment;
wherein configuring the operating environment using the second operating environment profile is in accordance with a determination that the user input in response to the prompt is indicative of approval to configure the operating environment; and
wherein the environmental change criteria further includes criterion that is satisfied when user input indicative of approval is received prior to configuring the operating environment using the second operating environment profile that the user input in response to the prompt is not indicative of approval to configure the operating environment:
maintaining an existing operating environment.

36. The method of claim 15, further comprising:
prior to configuring the operating environment using the second operating environment profile:
forgoing presenting a prompt requesting user approval to configure the operating environment using the second operating environment profile.

37. The method of claim 15, further comprising:
after configuring the operating environment using a second operating environment profile different from the first operating environment profile, maintaining the electronic device configured using the first data access control profile.

38. The method of claim 15, further comprising:
in accordance with a determination that the second user identifier does not satisfy an environmental change criteria, maintaining the operating environment.

39. The method of claim 15, further comprising:
in accordance with a determination that the first user identifier does not correspond to the first data access control profile:
forgoing configuring the electronic device using the first data access control profile; and
forgoing configuring the operating environment using the first operating environment profile.

* * * * *